United States Patent
Willis et al.

(10) Patent No.: US 10,233,323 B2
(45) Date of Patent: Mar. 19, 2019

(54) BLENDS OF SULFONATED BLOCK COPOLYMERS AND PARTICULATE CARBON AND MEMBRANES, FILMS, AND COATINGS COMPRISING THEM

(71) Applicant: Kraton Polymers U.S. LLC, Houston, TX (US)

(72) Inventors: Carl Lesley Willis, Houston, TX (US); Kuitian Tan, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 13/788,034

(22) Filed: Mar. 7, 2013

(65) Prior Publication Data
US 2013/0240438 A1    Sep. 19, 2013

Related U.S. Application Data

(60) Provisional application No. 61/611,330, filed on Mar. 15, 2012.

(51) Int. Cl.
| | | |
|---|---|---|
| *C08F 8/36* | (2006.01) | |
| *A62B 17/00* | (2006.01) | |
| *C08L 53/00* | (2006.01) | |
| *C08L 53/02* | (2006.01) | |
| *C08F 297/04* | (2006.01) | |

(52) U.S. Cl.
CPC .......... *C08L 53/005* (2013.01); *A62B 17/006* (2013.01); *C08F 8/36* (2013.01); *C08F 297/046* (2013.01); *C08L 53/025* (2013.01); *Y10T 442/2762* (2015.04); *Y10T 442/2861* (2015.04)

(58) Field of Classification Search
None
See application file for complete search history.

(56) References Cited

U.S. PATENT DOCUMENTS

| | | | |
|---|---|---|---|
| 3,450,795 A | 6/1969 | Langer | |
| 3,577,357 A | 5/1971 | Winkler | |
| (Continued) | | | |

FOREIGN PATENT DOCUMENTS

| | | | |
|---|---|---|---|
| CA | 716645 A | 8/1965 | |
| JP | H10306193 A | 11/1998 | |
| (Continued) | | | |

OTHER PUBLICATIONS

Giorno et al., "Permselectivty", Encyclopedia of Membranes, Springer-Verlag, Berlin, 2015, 1 total page.*

(Continued)

*Primary Examiner* — Bobby Ramdhanie
*Assistant Examiner* — Jonathan M Peo

(57) ABSTRACT

Blends comprising a sulfonated block copolymer and particulate carbon are useful materials for membranes, films and coatings in applications which require high dimensional stability, high water vapor transport, high conductivity, and low flammability. The sulfonated block copolymer comprises at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block.

19 Claims, 8 Drawing Sheets

(56) References Cited

U.S. PATENT DOCUMENTS

| | | | |
|---|---|---|---|
| RE27,145 E | 6/1971 | Jones | |
| 3,642,953 A | 2/1972 | O'Neill et al. | |
| 3,670,054 A | 6/1972 | De La Mare et al. | |
| 3,870,841 A | 3/1975 | Makowski et al. | |
| 3,985,830 A | 10/1976 | Fetters et al. | |
| 4,039,593 A | 8/1977 | Kamienski et al. | |
| 4,107,131 A | 8/1978 | Gergen et al. | |
| 4,107,236 A | 8/1978 | Naylor et al. | |
| 4,391,949 A | 7/1983 | St. Clair | |
| 4,444,953 A | 4/1984 | St. Clair | |
| 4,492,785 A | 1/1985 | Valint, Jr. et al. | |
| 4,505,827 A | 3/1985 | Rose et al. | |
| 4,876,005 A | 10/1989 | Raistrick | |
| 4,946,899 A | 8/1990 | Kennedy et al. | |
| 5,239,010 A | 8/1993 | Balas et al. | |
| 5,468,574 A * | 11/1995 | Ehrenberg et al. | 429/493 |
| 5,516,831 A | 5/1996 | Pottick et al. | |
| 5,925,621 A | 7/1999 | Zaneveld et al. | |
| 6,028,115 A | 2/2000 | Zaneveld et al. | |
| 6,099,990 A | 8/2000 | Denton, III et al. | |
| 6,239,182 B1 | 5/2001 | Zaneveld et al. | |
| 6,391,981 B1 | 5/2002 | Willis et al. | |
| 6,444,767 B1 | 9/2002 | Schade et al. | |
| 6,455,651 B1 | 9/2002 | Willis et al. | |
| 6,492,469 B2 | 12/2002 | Willis et al. | |
| 6,536,514 B1 | 3/2003 | Sugiyama et al. | |
| 6,537,538 B2 | 3/2003 | Zaneveld et al. | |
| 6,686,423 B1 | 2/2004 | Desbois et al. | |
| 6,699,941 B1 | 3/2004 | Handlin, Jr. et al. | |
| 6,767,976 B2 | 7/2004 | Hamada et al. | |
| 7,169,848 B2 | 1/2007 | Bening et al. | |
| 7,169,850 B2 | 1/2007 | Handlin, Jr. et al. | |
| 7,307,127 B1 * | 12/2007 | Napadensky et al. | 525/353 |
| 7,737,224 B2 | 6/2010 | Willis et al. | |
| 8,012,539 B2 | 9/2011 | Handlin, Jr. et al. | |
| 8,420,276 B2 | 4/2013 | Nakai et al. | |
| 2001/0034428 A1 | 10/2001 | Destarac et al. | |
| 2004/0039148 A1 | 2/2004 | Cao et al. | |
| 2004/0180250 A1 * | 9/2004 | Nanaumi et al. | 429/33 |
| 2006/0155376 A1 | 7/2006 | Asgari | |
| 2007/0021569 A1 * | 1/2007 | Willis | B01D 71/80 |
| | | | 525/314 |
| 2009/0280255 A1 * | 11/2009 | Handlin, Jr. | C08F 6/006 |
| | | | 427/358 |
| 2010/0048817 A1 | 2/2010 | Dado et al. | |
| 2010/0203783 A1 * | 8/2010 | Willis et al. | 442/59 |
| 2010/0323269 A1 * | 12/2010 | Nakai et al. | 429/480 |
| 2012/0073791 A1 | 3/2012 | Dubois | |
| 2012/0267248 A1 | 10/2012 | Willis | |
| 2013/0015071 A1 | 1/2013 | Willis | |

FOREIGN PATENT DOCUMENTS

| | | | |
|---|---|---|---|
| RU | 2404998 C2 | 11/2010 | |
| RU | 2425060 C2 | 7/2011 | |
| WO | WO 9740924 A1 * | 11/1997 | B01D 67/0088 |
| WO | 2008089332 A2 | 7/2008 | |

OTHER PUBLICATIONS

International Search Report and Written Opinion, dated May 7, 2013.

Coates, G.W., Hustad, P.D. and Reinartz, S., Agnew. Chem. Int., Ed., 41, 2236-2257 (2002).

Zhang, H. and Nomura, K., J. Am. Chem. Soc., vol. 127, No. 26, 2005, pp. 9364-9365.

Hawker, C.J., Rosman, A.W., and Harth, E., Chem. Rev. 101(12) 3661-3688 (2001).

Yeung, A.S. and Frank, C.W., Polymer, 31, pp. 2089-2100 and 2101-2111 (1990).

Taiwan Search Report dated Sep. 10, 2014.

Russian App. No. 2014141504 Search report dated Feb. 16, 2016.

China Search Report for CN201380019873.0.

\* cited by examiner

BLENDS OF SULFONATED BLOCK COPOLYMERS AND PARTICULATE CARBON AND MEMBRANES, FILMS, AND COATINGS COMPRISING THEM

FIELD OF THE INVENTION

The present disclosure relates to blends of sulfonated block copolymers and particulate carbon. More specifically, the disclosure provides compositions which comprise:
(a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block;
(b) particulate carbon; and
(c) optionally a liquid constituent.

The present disclosure also provides processes for making the compositions, and for products comprising them. The compositions exhibit extraordinary properties with regard to dimensional stability, water vapor transport and conductivity. Additionally, some of the blends pass the UL 94 HB ignition test, i.e., a standard test for flammability of polymer materials used for parts in devices and appliances which serves as a preliminary indication of the acceptability of the polymeric material with respect to flammability for particular applications. The particular property profile of the blends and compositions render the membranes, films and coatings comprising them uniquely suited for use in applications such as fuel cells and devices for, e.g., energy storage, harvesting, and recovery, as well as devices for purifying or detoxifying gases and liquids, including gear and garments for protection from harm due to chemical or biological hazards.

BACKGROUND OF THE DISCLOSURE

The preparation of styrenic block copolymers ("SBCs") is well known in the art. Generally, SBCs can comprise internal polymer blocks and terminal or end polymer blocks comprising chemically different monomer types thereby providing particular desirable properties. As an example, in a more common form, SBCs may have internal blocks of conjugated diene, or the hydrogenated counterparts thereof, and terminal blocks having aromatic alkenyl arenes. The interaction of the differing properties of the polymer blocks allow for different polymer characteristics to be obtained. For example, the elastomer properties of internal conjugated diene blocks, or the hydrogenated counterparts thereof, along with the "harder" aromatic alkenyl arenes terminal blocks together form polymers which are useful for an enormous variety of applications. Such SBCs can be prepared through sequential polymerization and/or through coupling reactions.

It is known also that SBCs can be functionalized in order to further modify their characteristics. An example of this is the addition of sulfonic acid or sulfonate ester functional groups to the polymer backbone. One of the first such sulfonated block copolymers is disclosed, for example, in U.S. Pat. No. 3,577,357 to Winkler. The sulfonated block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, the block copolymer being sulfonated to an extent sufficient to provide at least 1% by weight of sulfur in the total polymer and up to one sulfonate group per monovinyl arene unit. The sulfonated polymers can be used as such or in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The sulfonated block copolymers are described as having water absorption characteristics useful in water purification membranes and the like. Further sulfonated SBCs are disclosed or mentioned, e.g., in U.S. Pat. No. 3,642,953, U.S. Pat. No. 3,870,841, U.S. Pat. No. 4,492,785, U.S. Pat. No. 4,505,827, U.S. Pat. No. 5,239,010, U.S. Pat. No. 5,468,574, U.S. Pat. No. 5,516,831, and U.S. Pat. No. 7,169,850.

More recently, U.S. Pat. No. 7,737,224 to Willis et al., has described the preparation of sulfonated polymers and inter alia illustrated sulfonated block copolymers which are solid in water comprising at least two polymer end blocks and at least one polymer interior block wherein each end block is a polymer block resistant to sulfonation and at least one interior block is a polymer block susceptible to sulfonation, and wherein at least one interior block is sulfonated to the extent of 10 to 100 mol percent of the sulfonation susceptible monomer unit in the block. The sulfonated block copolymers are described as being able to transport high amounts of water vapor while at the same time having good dimensional stability and strength in the presence of water.

US 2010/0048817 to Dado et al. is illustrative of further developments in the manufacture of sulfonated block copolymers and describes a process for preparing sulfonated block copolymers illustrating, e.g., the sulfonation of a precursor block polymer having at least one end block A and at least one interior block B wherein each A block is a polymer block resistant to sulfonation and each B block is a polymer block susceptible to sulfonation wherein said A and B blocks are substantially free of olefinic unsaturation. The precursor block polymer was reacted with an acyl sulfate in a reaction mixture further comprising at least one non-halogenated aliphatic solvent. According to Dado et al., the process results in a reaction product which comprised micelles of sulfonated polymer and/or other polymer aggregates of definable size and distribution. More recently, U.S. Pat. No. 8,012,539 to Handlin et al., disclosed an improved process for preparing sulfonated block copolymers and esters thereof, as well as membranes comprising them.

Carbon black, carbon nanotubes, and fullerenes have been proposed among others as fillers or reinforcing agents for sulfonated block copolymers (e.g., U.S. Pat. No. 8,012,539, U.S. Pat. No. 7,737,224, U.S. Pat. No. 5,516,831, and U.S. Pat. No. 5,239,010). Additionally, it has been proposed to disperse metal impregnated carbon particles in sulfonated block copolymers to obtain electrode assemblies (e.g., U.S. Pat. No. 7,737,224, and U.S. Pat. No. 8,012,539).

However, the manufacture of composites comprising carbon and a polymer can be challenging as the polymer has to wet, and adhere to, the carbon particles. For example, perfluoroalkylenesulfonic acid polymer compounds, such as NAFION® available from DuPont, have been used widely as ion-conductive polymer binders of electrode catalyst layers employed, e.g., in fuel cells (e.g., U.S. Pat. No. 4,876,115). NAFION® is commercially available as a slurry in water. However, such slurries do not wet carbon well, and mixing carbon with the binder polymer is problematic. In addition, the adhesion of the respective sulfonic acid polymer to carbon is poor.

It has now been found that the sulfonated block copolymers specified at the outset are surprisingly well suited to disperse particulate carbon and form compositions having uniform consistency. When employing a suitable dispersant, the compositions form liquid dispersions having unexpectedly low viscosity which can easily be cast into films and membranes, and which can easily be coated on a broad variety of substrates. Moreover, the films, membranes and coatings comprising the compositions of the present disclosure are dimensionally stable in the presence of water, and surprisingly effective in transporting water vapor, heat and electricity.

SUMMARY OF THE DISCLOSURE

In a first aspect, the present disclosure relates to a composition comprising:
(a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block;
(b) particulate carbon; and
(c) optionally a liquid constituent.

In a second aspect, the present disclosure relates to the composition in accordance with the foregoing first aspect, wherein the sulfonated block copolymer has the general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, wherein n is an integer from 2 to about 30, and X is a coupling agent residue, and each D block is a polymer block resistant to sulfonation and the plurality of A blocks, B blocks, or D blocks are the same or different.

In a third aspect, the present disclosure relates to the composition in accordance with the foregoing second aspect, wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated In a fourth aspect, the present disclosure relates to the composition in accordance with either one of the foregoing aspects, wherein the particulate carbon is coke, carbon black, activated carbon, or carbon nanotubes, optionally comprising a catalytic metal component.

In a fifth aspect, the present disclosure relates to the composition in accordance with either one of the foregoing aspects, wherein the particulate carbon has an average particle size of from 0.1 nm to about 100 μm.

In a sixth aspect, the present disclosure relates to the composition in accordance with either one of the foregoing aspects, wherein the particulate carbon is an activated carbon, optionally comprising a catalytic metal of Group 8, 9, 10, or 11 of the Periodic Table of the Elements.

In a seventh aspect, the present disclosure relates to the composition in accordance with either one of the foregoing aspects in which the particulate carbon (b) and the sulfonated block copolymer (a) are present in a weight ratio of at least 0.01.

In an eighth aspect, the present disclosure relates to the composition in accordance with the foregoing seventh aspect, wherein the weight ratio is at least 0.05.

In a ninth aspect, the present disclosure relates to the composition in accordance with either one of the foregoing aspects which is in form of a dispersion and which comprises as the liquid constituent (c) at least one organic solvent as the dispersant.

In a tenth aspect, the present disclosure relates to the composition in accordance with the foregoing ninth aspect, wherein the organic solvent is an aprotic apolar solvent or a mixture of two or more aprotic apolar solvents.

In an eleventh aspect, the present disclosure relates to the composition in accordance with either one of the foregoing aspects which optionally comprises as the liquid constituent (c) an aprotic solvent, or a protic solvent, or a mixture of at least one aprotic and at least one protic solvent.

In a twelfth aspect, the present disclosure relates to the composition in accordance with the foregoing eleventh aspect, wherein the liquid constituent (c) is water or an aqueous medium.

In a thirteenth aspect, the present disclosure relates to an electrode, membrane, film, or coating comprising the composition in accordance with the foregoing twelfth aspect.

In a fourteenth aspect, the present disclosure relates to a process for the manufacture of the electrode, membrane, film, or coating in accordance with the foregoing thirteenth aspect, which comprises
i) providing a dispersion comprising
  (a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block;
  (b) particulate carbon; and
  (c) at least one organic solvent as the liquid constituent;
ii) casting the dispersion;
iii) evaporating the organic solvent(s) (c) to obtain the membrane, film, or coating; and
iv) optionally immersing the electrode, membrane, film, or coating obtained in (iii) in water or an aqueous medium.

In a fifteenth aspect, the present disclosure relates to a fuel cell, battery, or device for energy storage, harvesting, or recovery, for reverse or forward electrodialysis, for controlling humidity, for pressure retarded, forward or reverse osmosis, for electro- or capacitive deionization, or for purifying or detoxifying gases or liquids, comprising the electrode, membrane, film, or coating in accordance with the foregoing thirteenth aspect.

In a sixteenth aspect, the present disclosure relates to the device for energy storage, harvesting or recovery in accordance with the foregoing fifteenth aspect, wherein the membrane comprises the at least one sulfonated block copolymer and carbon black in a weight ratio of carbon black to the copolymer of from about 0.01 to about 1.0.

In a seventeenth aspect, the present disclosure relates to a coated article comprising a substrate and at least one coating comprising the composition in accordance with the foregoing eleventh aspect.

In an eighteenth aspect, the present disclosure relates to the coated article in accordance with the foregoing seventeenth aspect, wherein the substrate is a natural or synthetic, woven or non-woven material, or a mixture thereof.

In a nineteenth aspect, the present disclosure relates to the coated article in accordance with the foregoing seventeenth aspect which is a protective sheet, blanket, clothing or other garment, or equipment, adapted to protect from harm due to chemical or biological hazards.

In a twentieth aspect, the present disclosure relates to the coated article in accordance with the foregoing seventeenth aspect, wherein the substrate is a carbon electrode optionally comprising a catalytic metal component.

In a twenty-first aspect, the present disclosure relates to the coated article in accordance with the foregoing seventeenth aspect, wherein the substrate comprises (a$_1$) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block; and (c) optionally a liquid constituent, wherein the sulfonated block copolymer (a$_1$) of the substrate and the sulfonated block copolymer (a) of the coating are identical or different, and wherein the substrate is free of particulate carbon.

DETAILED DESCRIPTION OF THE DISCLOSURE

Figure 1:
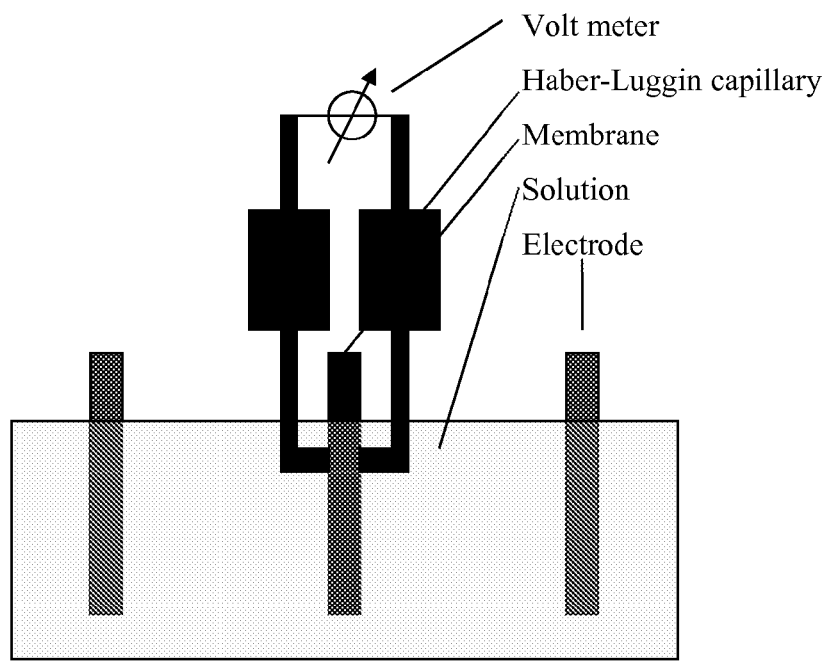
FIG. 1 is a schematic diagram of a set-up for measuring membrane resistance.

A detailed description of embodiments of the present invention is disclosed herein; however, it is to be understood that the disclosed embodiments are merely exemplary of the invention and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

Unless specifically stated otherwise, all technical terms used herein have the meaning as commonly understood by those skilled in the art.

The designation of groups of the Periodic Table of the Elements as used herein is in accordance with the current IUPAC convention.

Moreover, unless specifically stated otherwise, the following expressions as used herein are understood to have the following meanings:

Unless indicated otherwise, the expression "blend" as used herein refers to a solid dispersion comprising the sulfonated block copolymer (a) and the particulate carbon (b) which is essentially free of any liquid constituent (c).

The expression "solid" as used herein refers to or describes a material that does not flow perceptively under moderate stress, that has a definite capacity for resisting forces such as compression or tension, and that retains a definite size or shape under ordinary conditions.

Unless indicated otherwise, the expression "composition" as used herein refers to a solid or liquid dispersion comprising the sulfonated block copolymer (a), the particulate carbon (b), and optionally a liquid constituent (c). Those having ordinary skill in the art will appreciate that the expression "composition" is generic to, and may be used interchangeable with, the expression "blend."

Unless indicated otherwise, the expression "solid dispersion" as used herein refers to a system having a continuous, solid phase and at least one discontinuous phase. The continuous, solid phase of the solid dispersions herein in particular may be made up by the sulfonated block copolymer or by a hydrated sulfonated block copolymer. The discontinuous phase may be made up by solid, finely divided carbon particles and/or by liquid droplets, including colloidal particles and micelles.

Unless indicated otherwise, the expression "liquid dispersion" as used herein refers to a system having a continuous, liquid phase and at least one discontinuous phase. The continuous, liquid phase of the liquid dispersions herein in particular comprises one or more solvents or dispersants. The discontinuous phase may be made up by solid, finely divided particles and/or by liquid droplets, including colloidal particles and micelles. The expression "liquid dispersion" as used herein in particular includes systems in which at least one discontinuous phase is in form of micelles. Also, where the discontinuous phase(s) is(are) exclusively made up by liquid droplets, the expression "liquid dispersion" in particular encompasses "emulsion." A person of ordinary skill will readily appreciate that there are no sharp differences between liquid dispersions, colloidal or micellar solutions, and solutions on a molecular level. Thus, a liquid dispersion of micelles may also herein be referred to as a solution of micelles.

Unless indicated otherwise, the expression "dispersion" is used collectively for liquid and solid dispersions.

The expression "sulfonated block copolymer" as used herein refers to a block copolymer which contains sulfonic acid and/or sulfonate ester groups.

Unless indicated otherwise, the expressions "precursor block copolymer" or "precursor polymer" as used herein refers to optionally hydrogenated block copolymers that have not been sulfonated.

The expression "membrane" as used herein refers to a continuous, pliable sheet or layer of a material. For convenience and unless indicated otherwise, the expression "membrane" also may be used herein as a generic reference to membranes and membranous coverings, i.e., films and coatings.

The expression "film" as used herein refers to a membranous covering of a substrate wherein a membrane is reversibly attached to the substrate, i.e., the bonding between the membrane and the substrate allows separating the membrane from the substrate without causing significant harm to the integrity of the membrane.

The expression "coating" as used herein refers to a membranous covering of a substrate wherein a membrane is irreversibly attached to the substrate, i.e., under ordinary conditions the bonding between the membrane and the substrate does not allow separating the membrane from the substrate, or the separation causes significant harm to the integrity of the membrane.

Harm to the integrity of a membrane is considered insignificant so long as it does not prevent the membrane from performing a desired function. Those having ordinary skill will readily appreciate that there is no sharp boundary between the expressions "film" and "coating", and that any such boundary may be dependent upon the use or intended use, and the desired function, of the membranous covering.

Unless specifically stated otherwise, the expression "% wt." as used herein refers to the number of parts by weight of monomer per 100 parts by weight of polymer on a dry weight basis, or the number of parts by weight of ingredient per 100 parts by weight of a specified composition.

Unless specifically stated otherwise, the expression "molecular weight" as used herein and relating to a polymer refers to the number average molecular weight.

The expression "equilibrium" as used herein in the context of water absorption refers to the state in which the rate of water absorption by a material or membrane is in balance with the rate of water loss by the material or membrane. The state of equilibrium can generally be reached by immersing the material or membrane in water for a 24 hour period (one day). The equilibrium state may be reached also in other wet environments; however the period of time to reach equilibrium may differ.

The expression "hydrated" in relation to a membrane or material as used herein refers to the membrane or material which has absorbed a significant amount of water.

Unless indicated otherwise, the expressions "wet" and "wet state" in relation to a material or membrane as used herein refers to or describes the state at which the material or membrane has reached equilibrium or has been immersed in water for a period of 24 hours.

Unless indicated otherwise, the expressions "dry" and "dry state" in relation to a material or membrane as used herein refer to or describe the state of hydration of the material or membrane which has absorbed essentially no or only insignificant amounts of water. For example, a material or membrane which is merely in contact with the atmosphere is considered to be in the dry state.

The expression "engineering thermoplastic resin" as used herein encompasses the various polymers such as for example thermoplastic polyester, thermoplastic polyurethane, poly(aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131, the disclosure of which is hereby incorporated by reference.

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

According to several embodiments disclosed herein is has been found that blending the sulfonated block copolymers with particulate carbon has a surprising impact on the performance of membranes comprising these blends. For example, in some embodiments, the water uptake of membranes comprising the blends disclosed herein is significantly lower than the water uptake of membranes comprising the corresponding sulfonated block copolymers but lacking the carbon constituent. The reduced tendency of the membranes in accordance with the present disclosure to absorb water results in a distinctly improved dimensional stability of the membranes as compared to membranes comprising the sulfonated block copolymer but lacking the carbon constituent. In some embodiments, membranes comprising the blends exhibit exceptionally high levels of ion conductivity. In particular embodiments, the ion transport through the membrane is high in spite of the reduced tendency to absorb water. In some embodiments, the membranes exhibit high specific conductivity, high selectivity for cation transport, and low swelling on exposure to water. In further embodiments, the membranes in accordance with the present disclosure are considerably less flammable than those comprising the corresponding sulfonated block copolymer but lacking the carbon constituent.

Accordingly, the compositions of the present disclosure are broadly suited for a wide variety of end uses, and are especially useful for applications involving water or which take place in wet environments. In particular applications, membranes comprising the compositions described herein are broadly suited for electrically driven water separation processes, or for applications such as fuel cells and device for, e.g., energy storage, harvesting, and recovery, as well as devices for purifying or detoxifying gases and liquids, including gear and garments for protection from harm due to chemical or biological hazards.

In some embodiments, the compositions of the present disclosure include the sulfonated block copolymers described in U.S. Pat. No. 7,737,224 to Willis et al. Furthermore, the sulfonated block copolymers, including those described in U.S. Pat. No. 7,737,224, may be prepared according to the process of WO 2008/089332 to Dado et al. or the process of U.S. Pat. No. 8,012,539 to Handlin et al.

The precursor copolymers needed to prepare the sulfonated block copolymers of the present disclosure may be made by a number of different processes, including anionic polymerization, moderated anionic polymerization, cationic polymerization, Ziegler-Natta polymerization, and living chain or stable free radical polymerization. The anionic polymerization and related information is known in the art and is disclosed in, e.g., U.S. Re. 27,145, U.S. Pat. No. 3,985,830, U.S. Pat. No. 4,039,593, U.S. Pat. No. 4,391,949, U.S. Pat. No. 4,444,953, U.S. Pat. No. 6,391,981, U.S. Pat. No. 6,444,767, U.S. Pat. No. 6,455,651, U.S. Pat. No. 6,492,469, U.S. Pat. No. 6,686,423, and CA 716,645. Moderated anionic polymerization processes for making styrenic block copolymers are described, for example, in U.S. Pat. No. 6,391,981, U.S. Pat. No. 6,455,651 and U.S. Pat. No. 6,492,469. Cationic polymerization processes for preparing block copolymers are disclosed, for example, in U.S. Pat. No. 4,946,899.

Living Ziegler-Natta polymerization processes that may be used to make precursor copolymers were recently reviewed by G. W. Coates, P. D. Hustad, and S. Reinartz in *Angew. Chem. Int., Ed.,* 41, 2236-2257 (2002); a subsequent publication by H. Zhang and K. Nomura (*J. Am. Chem. Soc. Commun.*, 2005) describes the use of living Ziegler-Natta techniques for making styrenic block copolymers specifically. The extensive work in the field of nitroxide mediated living radical polymerization chemistry has been reviewed; see C. J. Hawker, A. W. Bosman, and E. Harth, *Chem. Rev.,* 101(12), 3661-3688 (2001). As outlined in this review, styrenic block copolymers were synthesized using living or stable free radical techniques. For the polymers of the present disclosure, nitroxide mediated polymerization methods will be the preferred living chain or stable free radical polymerization process.

1. Sulfonated Block Copolymer Structure

One aspect of the sulfonated block copolymers employed in the compositions described herein relates to the polymer structure of the sulfonated block copolymers. The sulfonated block copolymers will have at least two polymer end or outer blocks A and at least one polymer interior block B wherein each A block is a polymer block resistant to sulfonation and each B block is a polymer block susceptible to sulfonation.

Preferred polymer structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$ or mixtures thereof, where n is an integer from 2 to about 30, X is coupling agent residue and A, B and D are as defined herein below. Also preferred are polymer structures have the general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, wherein n is an integer from 2 to about 30, and X is a coupling agent residue, and each D block is a polymer block resistant to sulfonation and the plurality of A blocks, B blocks, or D blocks are the same or different. Most preferred structures are linear structures such as A-B-A, $(A-B)_2X$, A-B-D-B-A, $(AB-D)_2X$, A-D-B-D-A, and $(A-D-B)_2X$, and radial structures such as $(A-B)_nX$ and $(A-DB)_nX$ where n is 3 to 6.

Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture may include a certain amount of A-B diblock copolymer, in addition to any linear and/or radial polymers. The respective amounts have not been found to be detrimental to the practice of the disclosure.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers may be selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90% wt., preferably at least 95% wt., and even more preferably at least 98% wt. of the desired para-substituted styrene monomer.

When the A blocks are polymers of ethylene, it may be useful to polymerize ethylene via a Ziegler-Natta process, as taught in the references in the review article by G. W. Coates et al, as cited above. It is preferred to make the ethylene blocks using anionic polymerization techniques as taught in U.S. Pat. No. 3,450,795. The block molecular weight for such ethylene blocks typically is between about 1,000 and about 60,000.

When the A blocks are polymers of alpha olefins of 3 to 18 carbon atoms, such polymers are prepared by via a Ziegler-Natta process, as taught in the references in the review article by G. W. Coates et al, as cited above. Preferably, the alpha olefins are propylene, butylene, hexene or octene, with propylene being most preferred. The block molecular weight for such alpha olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236.

The A blocks may also be polymers of acrylic esters or methacrylic esters. Such polymer blocks may be made according to the methods disclosed in U.S. Pat. No. 6,767,976. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present disclosure. Examples of the anionic polymerizable monomer that can be optionally used include methacrylic or acrylic monomers such as trimethylsilyl methacrylate, N,N-dimethylmethacrylamide, N,N-diisopropylmethacrylamide, N,N-diethylmethacrylamide, N,Nmethylethylmethacrylamide, N,N-di-tert-butylmethacrylamide, trimethylsilyl acrylate, N,N, dimethylacrylamide N,N-diisopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers mentioned for the B blocks. In some embodiments, the A blocks may contain up to 10 mol percent, preferably they will contain only up to 5 mol percent, and particularly preferably only up to 2 mol percent, of the vinyl aromatic monomers mentioned in the B blocks. However, in the most preferred embodiments, the A blocks will contain no vinyl monomers mentioned in the B blocks. Accordingly, the sulfonation level in the A blocks may be from 0 up to 15 mol percent of the total monomers in the A block. It will be understood by those skilled in the art that suitable ranges include any combination of the specified mol percents even if the specific combination and range is not listed herewith.

Each B block comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted immediately before, the B blocks may also comprise a hydrogenated copolymer of such monomer(s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. In one preferred embodiment, the B blocks comprise a copolymer of conjugated dienes and the vinyl aromatic monomers noted in this paragraph wherein olefinic double bonds are hydrogenated. In another preferred embodiment, the B blocks are unsubstituted styrene monomer blocks which are aromatic by virtue of the nature of the monomer and do not require the added process step of hydrogenation. The B blocks having a controlled distribution structure are disclosed in U.S. Pat. No. 7,169,848. In one preferred embodiment, the B blocks are unsubstituted styrene blocks, since the polymer will not then require a separate hydrogenation step.

In another aspect, the sulfonated block copolymer of the present disclosure includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof having a vinyl content prior to hydrogenation of between 20 and 80 mol percent and a number average molecular weight of between 1,000 and 50,000. In another embodiment, the impact modifier block D comprises an acrylate or silicone polymer having a number average molecular weight of 1,000 to 50,000. In still another embodiment, the D block is a polymer block of isobutylene having a number average molecular weight of 1,000 to 50,000. In some embodiments, each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that the ranges include any combination of the specified mol percents even if the specific combination and range is not listed herewith.

As for the B block which are free of olefinic double bonds, in one preferred embodiment the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are where each B block contains one or more sulfonic functional groups. Preferred levels of sulfonation are 10 to 100 mol percent based on the mol percent of aromatic groups of all unsubstituted styrene monomer, ortho-substituted styrene monomer, meta-substituted styrene monomer, alpha-methylstyrene monomer, 1,1-diphenylethylene monomer, and 1,2-diphenylethylene monomer units which are present in each B block, more preferably about 20 to 95 mol percent and even more preferably about 30 to 90 mol percent. In some embodiments, each B block contains about 15 to 95 mol percent, or about 20 to 90, or about 25 to 80 mol percent of the sulfonic acid or sulfonate groups, based on the aromatic groups present in the B block(s). It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

2. Particulate Carbon

The particulate carbon employed in accordance with the present disclosure essentially may be any particulate form of carbon other than diamond and glassy carbon. Accordingly, the particulate carbon may be any amorphous carbon, e.g., coke, carbon black, and activated carbon, or may be carbon nanotubes, or may be a mixture of two or more thereof. In some embodiments and depending on the intended use of the membrane, the particulate carbon is an amorphous carbon, preferably carbon black or activated carbon, optionally in combination with one another or in combination with carbon nanotubes. In further embodiments, the particulate carbon is carbon back, or is activated carbon, or is carbon nanotubes, or is a combination of two or more thereof. In particular embodiments the particulate carbon is either carbon black, or is activated carbon, or is carbon nanotubes.

The particulate carbon generally is a carbon powder and the average particle size of the particulate carbon may be varied broadly. Also, the particle size distribution of the particulate carbon may be monomodal, or multimodal, i.e., bimodal, trimodal, etc.

The particle size of the particulate carbon may vary broadly and will generally depend upon the intended use of the membrane and on the desired ratio of the particulate carbon to the sulfonated block copolymer in the blend. Those having ordinary skill in the art will appreciate that larger particle sizes, especially when used in a blend having a high ratio of particulate carbon to the sulfonated block copolymer in the blend, may affect properties such as the flame retardant properties, the energy recovery efficiency, and the mechanical performance of membranes made from the blend, whereas small particle sizes of the particulate carbon may pose challenges when preparing the dispersion of the particulate carbon in the sulfonated block copolymer.

In general, the average particle size of the particulate carbon will be at most about 200 µm, or at most about 150 µm, or at most about 100 µm, or at most about 50 µm, and the average particle size of the particulate carbon will normally depend on the type of carbon, or the combination thereof, which is employed. Suitably, and also depending on the type of carbon which is employed, the average particle size of the particulate carbon will be at least 0.1 nm, or at least 0.4 nm, or at least 0.8 nm, or at least 1 nm, or at least 5 nm. Accordingly, in some embodiments, the average particle size of the particulate carbon may be from 0.1 nm to 200 µm, or from 0.4 nm to 200 µm, or from 0.8 nm to 200 µm, or from 1 nm to 200 µm, or from 5 nm to 200 µm. Alternatively, in some embodiments, the average particle size of the particulate carbon may be from 0.1 nm to 150 µm, or from 0.4 nm to 150 µm, or from 0.8 nm to 150 µm, or from 1 nm to 150 µm, or from 5 nm to 150 µm. In further embodiments, the average particle size of the particulate carbon may be from 0.1 nm to 100 µm, or from 0.4 nm to 100 µm, or from 0.8 nm to 100 µm, or from 1 nm to 100 µm, or from 5 nm to 100 µm. In other embodiments, the average particle size of the particulate carbon may be from 0.1 nm to 50 µm, or from 0.4 nm to 50 µm, or from 0.8 nm to 50 µm, or from 1 nm to 50 µm, or from 5 nm to 50 µm.

When the particulate carbon is or comprises activated carbon, the average particle size of the activated carbon typically may range from about 1 µm to about 350 µm, or from about 10 µm to about 275 µm, or from about 25 µm to about 250 µm. In some embodiments, the average particle size of the activated carbon may range from about 20 µm to about 350 µm, or from about 25 µm to about 200 µm, or from about 30 µm to about 100 µm. In further embodiments, the average particle size of the activated carbon may range from about 50 µm to about 350 µm, or from about 75 µm to about 300 µm, or from about 100 µm to about 250 µm.

When the particulate carbon is or comprises carbon black, the average particle size of the carbon black typically may range from about 1 nm to about 350 µm, or from about 5 nm to about 275 µm, or from about 10 nm to about 250 µm. In some embodiments, the average particle size of the carbon black may range from about 0.05 µm to about 250 µm, or from about 0.1 µm to about 200 µm, or from about 1.0 µm to about 150 µm, or from about 5.0 µm to about 100 µm. In further embodiments, the average particle size of the carbon black may range from about 0.02 µm to about 0.35 µm, or from about 0.03 µm to about 0.2 µm, or from about 0.04 µm to about 0.1 µm. In other embodiments, the average particle size of the carbon black may range from about 5 nm to about 200 nm, or from about 10 nm to about 150 nm, or from about 15 nm to about 100 nm.

When the particulate carbon is or comprises carbon nanotubes, the average particle size of the carbon nanotubes typically may range from about 0.1 nm to about 100 µm, or from about 0.5 nm to about 75 µm, or from about 0.7 nm to about 50 µm. In some embodiments, the average particle size of the carbon nanotubes may range from about 0.5 nm to about 100 µm, or from about 0.75 nm to about 25 µm, or from about 1.0 nm to about 10 µm, or from about 5.0 nm to about 1 µm. In further embodiments, the average particle size of the carbon nanotubes may range from about 0.02 nm to about 0.35 µm, or from about 0.03 nm to about 0.2 µm, or from about 0.04 nm to about 0.1 µm. Those having ordinary skill will appreciate that the average particle size of the carbon nanotubes may differ from the actual size of the nanotube(s) due to the presence of agglomerates.

The particulate carbon optionally may be impregnated with one of more catalytic metals. Suitable catalytic metals include all metals of the transition metal groups, i.e., Groups 3-12 of the Periodic Table of the Elements. In some embodiments, the catalytic metal is a metal of Groups 4-11 of the Periodic Table of the Elements. In further embodiments, the catalytic metal is a metal of Groups 8, 9, 10, and 11, of the Periodic Table of the Elements. Suitable metals include in particular ruthenium, osmium, rhodium, iridium, nickel, palladium, platinum, silver and gold. In some embodiments, the catalytic metal is or comprises ruthenium, rhodium, palladium, platinum, or two or more thereof. In further embodiments, the catalytic metal is or comprises platinum.

The weight ratio of the catalytic metal(s) to the particulate carbon has not been found to be critical in the context of the compositions and membranes of the present disclosure. Accordingly, the weight ratio may vary broadly and can be chosen based on the intended use of the membrane and based on economic considerations.

In some embodiments, the impregnated particulate carbon is or comprises activated carbon, carbon black, and/or carbon nanotubes. In particular embodiments, the impregnated particulate carbon is or comprises activated carbon. In other embodiments, the particulate carbon is pure, i.e., does not comprise a catalytic metal and does not comprise components differing from carbon other than those commonly present in commercial, non-impregnated carbon powders.

3. Blends of the Sulfonated Block Copolymer and the Particulate Carbon

The sulfonated block copolymer and the particulate carbon essentially may be blended in any weight ratio which yields a homogeneous solid dispersion of the particulate carbon in the sulfonated block copolymer. Those having ordinary skill in the art will appreciate that the limiting maximum amount of particulate carbon which can be blended with the sulfonated block copolymer to obtain a homogeneous solid dispersion will to a certain extent depend upon the average particle size and the particle size distribution of the particulate carbon. Generally, as the average particle size increases, the maximum amount of the particulate carbon which may be blended to obtain a homogeneous solid dispersion will decrease, and as the particle size distribution broadens, the maximum amount of the particulate carbon which may be blended to obtain a homogeneous solid dispersion will increase. In consideration of these trends, those having ordinary skill in the art will readily be able to determine the limiting maximum amount of a specific particulate carbon, or combination of carbons, which can be blended with a particular sulfonated block copolymer to obtain a homogeneous solid dispersion by routine screening, e.g., by preparing liquid dispersions comprising the specific particulate carbon(s) and the particular sulfonated block copolymer in varying weight ratios and casting the dispersions to obtain film samples.

In general, the sulfonated block copolymer and the particulate carbon may be blended in a weight ratio of the particulate carbon to the sulfonated block copolymer of at least about 0.01, or at least about 0.05, or at least about 0.1, or at least about 0.25.

The minimum amount of the particulate carbon which is present in the blend with the sulfonated block copolymer normally will depend upon the intended use of the membrane. For example, incorporation of as little as 1% wt. of the particulate carbon, based on the weight of the sulfonated block copolymer, may be sufficient to increase the moisture vapor transmission rate of the membrane by more than 25%, relative to a membrane made from the corresponding sulfonated block copolymer but lacking the particulate carbon constituent. Generally, an increase in the weight percentage of the particulate carbon, relative to the weight of the sulfonated block copolymer, will provide an increased capability of the membrane to transport water vapor, heat and electricity.

Accordingly, the weight ratio in which the sulfonated block copolymer and the particulate carbon may be blended can be varied broadly. In some embodiments, the weight ratio of the particulate carbon to the sulfonated block copolymer may range from about 0.01:50 to about 0.05:50, or from about 0.01:30 to about 0.05:30, or from about 0.01:10 to about 0.05:10. In other embodiments, the weight ratio of the sulfonated block copolymer to the particulate carbon may range from about 0.01:5 to about 0.05:5, or from about 0.01:1 to about 0.05:1.

The sulfonated block copolymers and the particulate carbon may be blended with one another using any blending procedure generally known in the art including, e.g., melt blending, dry blending and blending in liquid dispersion. If has been found to be particularly advantageous to blend the sulfonated block copolymers and the particulate carbon in a liquid dispersion using a suitable organic solvent as the dispersant.

4. Dispersions of the Sulfonated Block Copolymer and the Particulate Carbon

Conveniently, the liquid dispersion of the sulfonated block copolymer and the particulate carbon is obtained by providing (a) a solution or dispersion of the at least one sulfonated block copolymer in a suitable solvent or dispersant, and (b) the particulate carbon, optionally in form of a dispersion in a suitable dispersant; and (c) combining the solution or dispersion (a) with (b).

Suitable solvents and dispersants generally include organic solvents and dispersants. In some embodiments, the organic solvent or dispersant which is used for providing the solution or dispersion (a), and optionally the dispersion (b), is an aprotic solvent or is a mixture of two or more aprotic solvents. In further embodiments, the organic solvent or dispersant is a mixture of at least one aprotic (polar or apolar) solvent and at least one protic solvent. In particular embodiments, the organic solvent or dispersant which is used for providing the solution or dispersion (a), and optionally the dispersion (b), is an aprotic apolar solvent or is a mixture of at least one aprotic and at least one protic solvent.

In one embodiment, the solution or dispersion (a) is a micellar solution of the sulfonated block copolymer and an apolar, liquid phase and is obtained by dissolving a sulfonated block copolymer having at least one end block A and at least one interior block B wherein each block A contains essentially no sulfonic acid or sulfonate ester functional groups and each block B is a polymer block containing from about 10 to about 100 mol percent sulfonic acid or sulfonate ester functional groups based on the number of monomer units present in the block B in an apolar liquid phase.

In some embodiments, the apolar, liquid phase of the solution or dispersion (a), and optionally the dispersion (b), is formed by one or more aprotic apolar solvents which are preferably non-halogenated. Illustrative examples include hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In particular embodiments, the apolar liquid phase of the solution or dispersion (a), and optionally the dispersion (b), comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further embodiments, the apolar liquid phase of the solution or dispersion (a) is formed by at least two aprotic apolar solvents each of which is preferably non-halogenated. In further particular embodiments, the apolar liquid phase comprises at least one solvent selected from hexanes, heptanes and octanes and mixtures thereof, being mixed with cyclohexane and/or methylcyclohexane.

The concentration of the sulfonated block copolymer in the apolar liquid phase of the solution or dispersion (a) depends upon the composition of the sulfonated block polymer, since the limiting concentration below which polymer gelling is non-disabling or negligible depends upon the polymer composition. The limiting concentration may also be dependent on other factors such as the identity of the solvent or the solvent mixture. Generally, the polymer concentration falls within the range of from about 0.1% wt. to about 30% wt., alternatively from about 0.5% wt. to about 20% wt., alternatively from about 1% wt. to about 15% wt., alternatively from about 1% wt. to about 12% wt., or alternatively from about 1% wt. to about 10% wt., based on the total weight of the solution or dispersion (a) that is preferably substantially free of halogenated solvents. It will be understood by those skilled in the art that suitable ranges include any combination of the specified mol percents even if the specific combination and range is not listed herewith.

The sulfonated block copolymer can be dissolved or dispersed in the apolar, liquid phase to obtain the solution or dispersion (a) in form of a micellar solution, for example, by combining requisite amounts of the sulfonated block copolymer and the solvent or solvents at a temperature of from about 20° C. to the boiling point of the employed solvent or solvents. In general, the dissolution temperature is in a range of from about 20° C. to about 150° C., or from about 20° C. to about 100° C., or from about 20° C. to about 80° C., or from about 30° C. to about 70° C., or from about 40° C. to about 60° C. (e.g., at about 50° C.). The dissolution time can be in the range of from approximately less than 1 minute to approximately 24 hours or longer, dependent on the temperature of the mixture as well as factors such as the nature of the sulfonated block copolymer, i.e., molecular weight and degree of sulfonation, and the concentration of the sulfonated block copolymer in the liquid phase.

Alternatively, the micellar solution/dispersion (a) of the sulfonated block copolymer may be provided by sulfonating a corresponding block copolymer precursor in the manner described in US 2010/0048817 or in U.S. Pat. No. 8,012,539.

In other embodiments, the solution or dispersion (a) is formed by dissolving or dispersing the sulfonated block copolymer in one or more aprotic-polar solvents which are preferably non-halogenated. Illustrative examples of aprotic-polar solvents include, for example, ethers, e.g., methyl-tert-butyl ether, tetrahydrofuran (THF), dioxan and the like, esters, e.g., ethyl acetate and the like, ketones, e.g., methyl-iso-butylketone (MIBK) and the like, formamides, e.g., dimethylformamide (DMF) and the like, sulfoxides, e.g., dimethylsulfoxide (DMSO) and the like. It will be understood by those skilled in the art that the solvent employed for mixing, dispersing or dissolving the sulfonated block copolymer may be a single solvent or may be a combination of two or more such solvents.

In further embodiments, the solution or dispersion (a) is formed by dissolving or dispersing the sulfonated block copolymer in a mixture of solvents comprising at least one apolar and at least one aprotic-polar solvent.

The dispersant which is used when the particulate carbon is employed in form of a dispersion (b) may be the same as, or may be different from, the solvent or dispersant which is employed in providing the solution or dispersion (a) provided that the dispersant for (b) and the solvent or dispersant for (a) are miscible with one another and form a single and continuous liquid phase when the solution or dispersion (a) and the dispersion (b) are combined. Conveniently, the dispersant for (b) is identical with at least one of the solvents or dispersants employed to obtain the solution or dispersion (a).

The concentration of the particulate carbon in the dispersant can vary broadly when the particulate carbon is employed in form of a dispersion (b). However, from an economic and environmental point of view it is preferred that the concentration of the particulate carbon be high. Also, it has been found that the viscosity of the dispersion which is obtained upon combining the solution or dispersion (a) with (b) is surprisingly significantly lowered. Thus, it has been found to be sufficient to "wet" the surface of the particulate carbon with the requisite dispersant to obtain a dispersion (b) having the consistency of, e.g., sludge or mud. Accordingly, in some embodiments the weight ratio of the particulate carbon to the liquid dispersant is at most 1:5, or is at most 1:4, or is at most 1:3, or is at most 1:2.

The manner in which the solution or dispersion (a) is combined with the particulate carbon constituent (b) is generally not critical. Thus, the liquid dispersion of the sulfonated block copolymer and the particulate carbon can be obtained by adding the solution or dispersion (a) to the carbon or the dispersion (b), or by adding the carbon or the dispersion (b) to the solution or dispersion (a). Conveniently, especially when a dispersion (b) is used which has a sludgy or muddy consistency, the solution or dispersion (a) preferably is added to the dispersion (b). In some embodiments, it has been found that the particulate carbon preferably be wetted with the dispersant before blending with the solution or dispersion (a) to at least minimize if not avoid the formation of air bubbles when the carbon and the solution or dispersion (a) are combined. However, it will be appreciated by those having ordinary skill in the art that it is also possible to combine the solution or dispersion (a) with particulate carbon that has not been wetted with, or dispersed in, a dispersant. When this approach is taken, it is normally preferable to add the particulate carbon (b) in portions to the solution or dispersion (a) until the desired ratio of the sulfonated block copolymer to carbon has been reached.

The liquid dispersion of the sulfonated block copolymer and the particulate carbon thus obtained generally is homogenized by agitating the liquid dispersion for a period of time at a temperature of from about 20° C. to about 150° C., or from about 20° C. to about 100° C., or from about 20° C. to about 80° C., or from about 30° C. to about 70° C., or from about 40° C. to about 60° C. Homogenization may be initiated prior to, during or after combining the solution or dispersion (a) with the carbon or the carbon dispersion (b). The optimal time and temperature for homogenizing the liquid dispersion of the sulfonated block copolymer and the particulate carbon may depend on factors such as the nature of the sulfonated block copolymer, i.e., molecular weight and degree of sulfonation, the concentration of the sulfonated block copolymer in the liquid phase, the weight ratio of the sulfonated block copolymer to the particulate carbon, and the average particle size and particle size distribution of the particulate carbon. For example, longer periods of time and/or higher temperatures may be required if the molecular weight and/or the degree of sulfonation of the sulfonated block copolymer is high, and/or if the concentration of the sulfonated block copolymer in the liquid phase is high, and/or if the weight ratio of the sulfonated block copolymer to the particulate carbon is low, and/or if the particle size of the particulate carbon is high. Accordingly, the time for homogenizing the liquid dispersion may range from approximately less than 1 minute to approximately 24 hours or longer, depending on the foregoing factors and the temperature of the mixture. Higher temperatures and prolonged agitation of the dispersion also may be advantageous when the particulate carbon is employed in substance rather than in form of the dispersion (b). Those having ordinary skill in the art will appreciate that the time and/or temperature necessary for homogenizing the liquid dispersion of the sulfonated block copolymer and the particulate carbon may also be influenced by the manner in which the liquid dispersion is agitated, i.e., stirring, shaking, high-shear mixing, etc.

Surprisingly, the viscosity of the homogenized liquid dispersion which is formed upon intimate mixture of the sulfonated block copolymer, the particulate carbon and the solvent/dispersant, generally, is lower than that of a dispersion of the particulate carbon in the corresponding amount of the solvent/dispersant in the absence of the sulfonated block copolymer. Also, surprisingly, whereas the particulate carbon tends to settle when combined with the solvent/dispersant in the absence of the sulfonated block copolymer, no such settling was observed for the homogenized liquid dispersion comprising the sulfonated block copolymer and the particulate carbon.

In various embodiments, the viscosity of the homogenized liquid dispersion which is obtained in the manner described in the foregoing is sufficiently low to allow casting of the liquid dispersion into membranes. It will be understood by those skilled in the art, however, that the viscosity of the homogenized liquid dispersion may be adjusted further, if desired, by evaporating a part of the liquid phase, i.e., under reduced pressure and/or at an elevated temperature, or by increasing the amount of the liquid phase relative to the amount of the blend of sulfonated block copolymer and particulate carbon.

The solid dispersions of the sulfonated block copolymer are generally obtained from the foregoing liquid dispersions by evaporating the aprotic solvent/dispersant and, optionally, immersing the resulting blend in a protic medium, i.e., a protic solvent or a protic mixture of two or more solvents. Suitable protic solvents include in particular water, and alcohols. Protic mixtures include solvent mixtures comprising two or more protic solvents, or comprising at least one protic solvent and one or more organic solvents provided that the organic solvent(s) is(are) miscible with the at least one protic solvent, and the protic medium forms a single continuous liquid phase. In particular embodiments, the protic medium is an aqueous medium, i.e., is water or is an aqueous mixture comprising, in addition to water, one or more alcohols and/or one or more organic solvents provided that the aqueous mixture forms a single continuous liquid phase.

Correspondingly, the electrodes, membranes, films, and coatings described herein may be obtained by
  i) providing the afore-described liquid dispersion comprising
    (a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block;
    (b) particulate carbon; and
    (c) at least one organic solvent as the liquid constituent;
  ii) casting the liquid dispersion;
  iii) evaporating the organic solvent(s) (c) to obtain a non-hydrated or dry form of the membrane, film, or coating; and
  iv) optionally immersing the electrode, membrane, film, or coating obtained in (iii) in water or in an aqueous medium to obtain the electrode, membrane, film, or coating in partially or fully hydrated form.

The thickness of the electrodes, membranes, films and coatings, for the applications described herein can vary broadly and usually will depend upon the average particle size of the particulate carbon as well as requirements of the target application of the membranes, films and coatings. In most cases, the electrodes, membranes, films and coatings may have a thickness of at least about 0.5 µm and at most about 1000 µm and, typically, the thickness will range from about 1 to about 250 µm, e.g., from about 5 to about 150 µm, or from about 15 to about 100 µm.

Substrates which may be coated with the liquid dispersion include natural and synthetic, woven and non-woven materials as well as substrates made of one or more of such materials. The shape and form of the substrate may vary broadly, and include fibers, films, textiles, leather and wood parts or constructs.

Essentially, any fibrous material can be coated, impregnated or otherwise treated with the liquid dispersion by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, spray coating, electro-coating, direct coating, transfer coating, and a number of different film lamination processes. In a direct coating method, the liquid dispersion is cast onto the appropriate substrate, usually a textile, and subsequently dried, and optionally cured or crosslinked, e.g. under controlled conditions of temperature and dwell time or throughput. This provides a coated layer comprising the solid dispersion on the substrate. The coated layer is typically non-microporous.

In this method, the coated layer may be applied either directly on the substrate, or the substrate may comprise one or more additional layers, e.g. polymer layers, on its surface. Moisture-vapor permeable tie or base coats and intermediate layers may, for example, be present on the substrate surface. For instance, the substrate may be a textile having a layer of foamed, microporous or hydrophilic polymer. Thus, multi-layer coatings having several coated layers (and/or film layers) are provided. In some embodiments, the coating layer comprising the solid dispersion in accordance with the present disclosure is provided as the outermost layer.

In a transfer coating method, the liquid dispersion is cast onto a removable release substrate, e.g. release paper and then dried and optionally cured to provide a film on the release substrate. The release substrate is, for example, a siliconized paper or blanket. The film or membrane may be stored and/or transported in this format prior to further use, or the release substrate may be removed prior to storage or use.

The film or membrane can typically then be bonded to, or coated onto, a substrate material using thermal energy, or by using a layer of adhesive. The layer of adhesive may be applied to either the film or membrane, or to the substrate material or to both. The adhesive layer may be either continuous or discontinuous and typically comprises a foamed, microporous or hydrophilic polymer formulation. The film may be removed from the release substrate either before or after coating the membrane to the substrate material.

In the foregoing manner, directly coated layers as well as multi-layer coatings may be produced. For example, the coating which is applied to the material may be a pre-formed multi-layer film or membrane, and/or additional layers may be present on the material prior to application of the membrane of the disclosure. These additional layers may be moisture-vapor permeable tie or base coats and intermediate layers. Thus, multi-layer films, and materials coated with multiple film layers (and/or coating layers), are provided. In some embodiments, the coating layer comprising the solid dispersion of the disclosure is provided as the innermost layer.

Combinations of one or more inner layers comprising a coating according to the present disclosure with conventional, less hydrophobic layers may be anisotropic, and may show a directional effect of moisture-vapor flow on the water vapor resistance. This effect is most obvious in bi- and multilayer systems, and the magnitude of the effect is significant in the context of the overall breathability of the materials. Synergy may be observed when the vapor flow occurs first through the film or coating in accordance with the present disclosure, which results in lower than expected water vapor resistance values for the composite. Conversely, vapor flow that occurs first through a less hydrophobic layer may have an undermining effect on the layer comprising a coating according to the present disclosure, which results in higher than expected water vapor resistance values. This additional control feature for moisture-vapor flow may be usefully incorporated into the design of multilayer films, other materials such as coated fabrics and end products such as garments.

In addition to the mandatory blend of the sulfonated block copolymer(s) and the particulate carbon, the dispersions in accordance with the present disclosure may comprise conventional additives, e.g., (1) colorants, antioxidants, stabilizers, surfactants, waxes, and flow promoters; (2) particulates and fillers different from particulate carbon; and (3) oils, solvents and other materials added to enhance processability and handling of the dispersions.

Colorants, antioxidants, stabilizers, surfactants, waxes and flow promoters, when utilized in combination with the dispersions in accordance with the present disclosure may be included in a total amount up to and including 10%-wt., i.e., from 0 to 10%, based on the total weight of the blend of the sulfonated block copolymer and the particulate carbon. When any one or more of these components are present, each may be present in an amount from about 0.001 to about 5% wt., and more preferably from about 0.001 to about 1% wt.

Particulates and fillers other than the particulate carbon are normally unnecessary for blends in which the weight ratio the sulfonated block copolymer and the particulate carbon is about 1:1 or less, i.e., the blend of the sulfonated block copolymer and the particulate carbon comprises at least 50% wt. of the particulate carbon, based on the total weight of the sulfonated block copolymer and the particulate carbon. However, increasing amounts of the particulates and fillers may be incorporated as the weight percentage of the particulate carbon in the blend of the sulfonated block copolymer and the particulate carbon decreases below 50% wt., or below 35% wt., or below 20% wt., or below 5% wt. In such embodiments, the particulates and fillers other than the particulate carbon may be incorporated in amounts to provide a total of up to and including 50% wt. of the particulates, fillers, and the particulate carbon, based on the total weight of the sulfonated block copolymer, the particulates, fillers, and the particulate carbon. In some embodiments, the blends and compositions according to the present disclosure do not comprise particulates and/or fillers other than the particulate carbon. In other embodiments, the blends and compositions according to the present disclosure comprise up to and including 5% wt., or up to and including 15% wt., or up to and including 25% wt., or up to and including 35% wt., of particulates and fillers other than the particulate carbon, provided that the total amount of particulates, fillers and the particulate carbon in the blend does not exceed 50% wt., based on the total weight of particulates, fillers, the particulate carbon, and the sulfonated block copolymer.

It will be understood by those having ordinary skill in the art that the amount of oils, solvents and other materials added to enhance processability and handling of the composition will in many cases depend upon the particular composition formulated, the intended application, as well as the solvent and/or other material added. Typically the amount of such processing aids will not exceed 50% wt., or will be below 35% wt., or below 20% wt., or below 5% wt., based on the total weight of the composition.

Depending on the intended use, the blends further may be compounded with a large variety of other polymers not adversely affecting the blend properties, including olefin polymers, styrene polymers, hydrophilic polymers, and engineering thermoplastic resins. In particular, the blends may be compounded with conventional styrene/diene and hydrogenated styrene/diene block copolymers, such as the styrene block copolymers available from Kraton Polymers LLC. Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are combinations of the blends with the block copolymer precursor, i.e., the block copolymer prior to sulfonation.

Olefin polymers suited for compounding with the blend include, for example, ethylene homopolymers, ethylene/alpha-olefin copolymers, propylene homopolymers, propylene/alpha-olefin copolymers, high impact polypropylene, butylene homopolymers, butylene/alpha-olefin copolymers, and other alpha-olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and combinations of PVC with other materials.

Styrene polymers suited for compounding with the blends include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25% wt. copolymerized styrene monomer.

Hydrophilic polymers suited for compounding with the blends include polymeric bases which are characterized as having an available pair of electrons for interaction with acids. Examples of such bases include polymeric amines such as polyethyleneamine, polyvinylamine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinylalcohol), polysaccharides, and starches. Other hydrophilic polymers that may be utilized include sulfonated polystyrene.

When utilized in combination with the blends or dispersions in accordance with the present disclosure, such other polymers generally may be employed in a total amount of up to and including 25% wt., i.e., from 0 to 25% wt., based on the total weight of the blend of the sulfonated block copolymer and the particulate carbon. When two or more of such polymers are present, each may be present in amount of from about 0.01 to about 24.99% wt., more preferably from about 1.5 to 23.5% wt., provided that the total amount of all polymers other than the sulfonated block copolymer(s) does not exceed 25% wt. based on the total weight of the blend of the sulfonated block copolymer and the particulate carbon.

5. Properties of the Solid Dispersions

According to several embodiments, it has been found that blending the sulfonated block copolymer with the particulate carbon has a surprising impact on the performance of the material. For example, in some embodiments, the water uptake of membranes comprising the blend is significantly lower than the water uptake of membranes comprising the corresponding sulfonated block copolymers without the particulate carbon. The reduced tendency of the membranes comprising the blends according to the present disclosure to take up water results in a distinctly improved dimensional stability of the membranes in humid and aqueous environments as compared to membranes comprising the sulfonated block copolymer without the particulate carbon. In some embodiments, membranes comprising the blends according to the present disclosure exhibit an exceptionally high level of ion conductivity. In particular embodiments, the ion transport through the membrane is high in spite of the low tendency of the blend to take up water. In some embodiments, the membranes exhibit high specific conductivity, high selectivity for cation transport, and low swelling on exposure to water. In some embodiments, the blends in accordance with the present disclosure are distinctly less flammable than the corresponding sulfonated block copolymer.

It has been found that blending the sulfonated block copolymers with particulate carbon improves the tensile modulus of the sulfonated block copolymers as compared to the corresponding sulfonated block copolymers in the absence of the particulate carbon. In other words, the blends in accordance with the present disclosure exhibit a lower tensile modulus in the dry state than a corresponding sulfonated block copolymer which does not comprise the particulate carbon. Additionally, the hydrated blends in accordance with the present disclosure exhibit a wet tensile modulus which is essentially the same or only slightly lower than the modulus in the dry state. Therefore, according to some embodiments, in both wet and dry states, the blends in accordance with the present disclosure will have the same or a similar modulus. The membranes made using the blends in accordance with the present disclosure, thus, retain their softness and drape performance independent of the humidity of the environment.

Although the blends in accordance with the present disclosure take up less water than the corresponding sulfonated block copolymers in the absence of the particulate carbon it has been found, surprisingly, that the blends have remarkably high water vapor transport rates while at the same time having very good dimensional stability. It was surprisingly found that the water vapor transport rate (WVTR) of the blends in accordance with the present disclosure is at least as high as, and frequently exceeds, the WVTR of the corresponding sulfonated block copolymer. Accordingly, in some embodiments the WVTR of the blends in accordance with the present disclosure is at least about 100% of the WVTR of a corresponding sulfonated block copolymer not comprising the particulate carbon. In other embodiments, the WVTR is at least about 105% of the WVTR of a corresponding sulfonated block copolymer. In further embodiments, the WVTR is at least about 110% of the WVTR of a corresponding sulfonated block copolymer. In still further embodiments, the WVTR is at least about 115% of the WVTR of a corresponding sulfonated block copolymer. In even further embodiments, the WVTR is at least about 120% of the WVTR of a corresponding sulfonated block copolymer. In additional embodiments, the WVTR is at least about 125% of the WVTR of a corresponding sulfonated block copolymer. In further embodiments, the WVTR is at least about 130% of the WVTR of a corresponding sulfonated block copolymer. It will be understood by those skilled in the art that suitable ranges include any combination of the specified percentages even if the specific combination and range is not listed herewith.

In some embodiments, the WVTR may also be quantified using the inverted cup method in terms of $g/m^2/day$ which is the amount of water in grams which is transported through the membrane into a 50% relative humidity atmosphere at 25° C. using a membrane having 1 $m^2$ of exposed area and 1 mil of thickness in a day of exposure. Accordingly, in some embodiments in accordance with the present disclosure has a WVTR of at least about 1000 $g/m^2/day$. In other embodiments, the WVTR is at least about 2500 $g/m^2/day$. In further embodiments, the WVTR is at least about 10,000 $g/m^2/day$. In even further embodiments, the WVTR is at least about 15,000 $g/m^2/day$. In still further embodiments, the WVTR is at least about 20,000 $g/m^2/day$. It will be understood by those skilled in the art that suitable ranges include any combination of the specified rates even if the specific combination and range is not listed herewith.

Surprisingly, the blends in accordance with the present disclosure exhibit a high WVTR while maintaining very good dimensional stability. Dimensional stability can refer to the overall physical shape of a membrane or article comprising the blend in accordance with the present disclosure. Thus, polymers with good dimensional stability are more likely to maintain their form, and are less likely to sag or change shape, e.g., when exposed to humid or aqueous environments. The dimensional stability of a membrane can be assessed in a number of ways including, e.g., measuring the length, width, and thickness of a membrane in both wet and dry states, or measuring the water uptake of the membrane.

The expression "water uptake value" as used herein refers to the weight of water which is absorbed by a sulfonated block copolymer, or by the blend thereof, in equilibrium as compared to the original weight of the dry sulfonated block copolymer or the dry blend, and is calculated as a percentage. A lower water uptake value indicates that less water has been absorbed and therefore corresponds to a better dimensional stability of the material.

The surprising and advantageous dimensional stability is desirable, e.g., in applications where a membrane is constrained in a mounting device and small changes in the dimensions of the membrane may cause buckling and tearing, thereby inevitably causing the performance of the membrane to degrade or even fail. The dimensional stability thus is desirable, for example, for water management applications, desalination applications, humidity regulation devices, battery separators, fuel cell exchange membranes, medical tubing applications, various electrically driven ion-transport processes, and the like. The dimensional stability of the blends in humid and aqueous environments, also, is particularly advantageous in applications where the blend is applied as a coating as the dimensional stability reduces the tendency of the coating to delaminate from the substrate when exposed to humid conditions or an aqueous environment.

In some embodiments, the water uptake value of a blend in accordance with the present disclosure is equal to or less than the water uptake value of the corresponding sulfonated block copolymer not comprising the particulate carbon. In some embodiments, the water uptake value is less than 80% the water uptake value of the corresponding block copolymer. In further embodiments, the water uptake value is less than 50% the water uptake value of the corresponding block copolymer. In further embodiments, the water uptake value is less than 25% the water uptake value of the corresponding block copolymer.

Furthermore, in some embodiments, the water uptake value of the blend in accordance with the present disclosure is at most 90% relative to the dry blend. In other embodiments, the water uptake value of the blend in accordance with the present disclosure is at most 75% relative to the dry blend. In additional embodiments, the water uptake value of the blend in accordance with the present disclosure is at most 50% relative to the dry blend. In further embodiments, the water uptake value of the blend in accordance with the present disclosure is at most 25% relative to the dry blend. In still further embodiments, the water uptake value of the blend in accordance with the present disclosure is at most 20% relative to the dry blend. It will be understood by those skilled in the art that suitable ranges include any combination of the specified percentages even if the specific combination and range is not listed herewith.

In addition to being dimensionally stable, it has been found that membranes comprising the blend in accordance with the present disclosure exhibit exceptional transport characteristics. In some embodiments, the membranes disclosed herein exhibit a high electro-conductivity. The respective blends and membranes, therefore, are particularly suited as materials for electrodes.

In some embodiments, the membranes disclosed herein exhibit a high selectivity to transport cations, in particular protons, and have a conductivity of at least 0.5 mS/cm. The respective membranes, therefore, are suited as membranes in fuel cells and the like.

In some embodiments, the membranes in accordance with the present disclosure having a thickness of about 20-45 µm are conductive and exhibit an area resistance of no more than 5 $\Omega cm^2$.

The area resistance of a membrane can be determined by direct current (DC) measurements or by alternating current (AC) measurements. Resistance measured by DC is typically higher than resistance measured by AC, because resistance measured by DC includes boundary layer effect. Since the boundary layer effect always exists in the real application, resistance data from a DC method more closely represent the performance of the material in a practical application. For measuring membrane resistance, the potential drop between Haber-Luggin capillaries (in the art also referred to as Luggin or Luggin-Haber capillaries) is measured with and without the membrane as a function of the current density in an apparatus schematically shown in FIG. 1. The resistance is given by the slope of the current vs. the voltage drop. To obtain the membrane resistance, the resistance without the membrane is subtracted from the resistance with the membrane. FIG. 2 illustrates how to obtain membrane resistance. Membrane resistance is the difference in slope.

Figure 3:
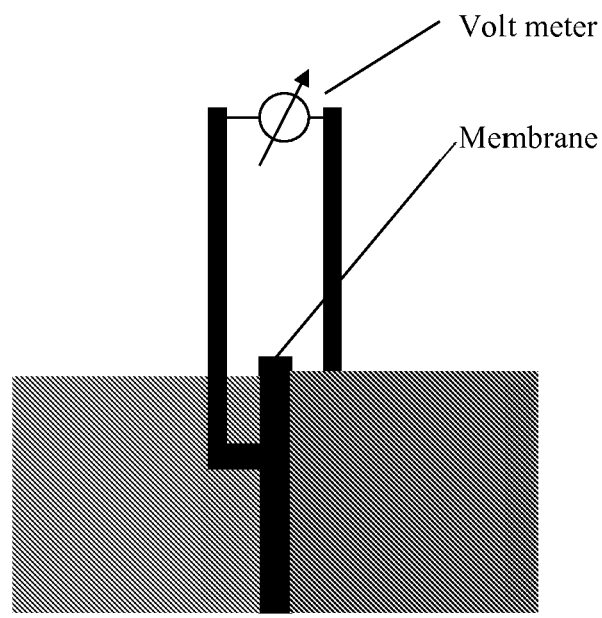
FIG. 3 schematically illustrates the experiment set-up for measuring the permselectivity.

In some embodiments, it has surprisingly been found that the membranes in accordance with the present disclosure are permselective. The permselectivity of the membranes can be determined as an "apparent" permselectivity based on the measurement of the potential gradient across a membrane which separates two electrolyte solutions having different electrolyte concentrations. Those of ordinary skill will appreciate that the apparent permselectivity is always larger than the permselectivity under practice conditions because the measurement fails to account for boundary layer effects. However, the difference between the measured permselectivity value and the permselectivity under practice conditions is generally small. FIG. 3 schematically illustrates the experiment set-up for measuring the permselectivity. In the illustrative set-up of FIG. 3, the electrolyte solution on one side of the membrane has a concentration of 0.5M KCl, and the electrolyte concentration is the solution on the other side of the membrane is 1M KCl. For a membrane with transport number of 1, the potential difference across the membrane should be 0.0158 volt. On this basis, the permselectivity of the actual membrane can be calculated according to following equation:

Permselectivity (%)=potential drop across membrane/0.0158

Of course, other solutions and concentrations can be used, too. But corrections need to be made for different concentrations as well as for difference in ion mobility in solutions.

In some embodiments, the blends in accordance with the present disclosure are permselective. The permselectivity of the blends in accordance with the present disclosure is similar to or better than the permselectivity of a corresponding sulfonated block copolymer lacking the particulate carbon. Accordingly, in some embodiments, the permselectivity of the blend in accordance with the present disclosure is at least 90% of that of a corresponding sulfonated block copolymer.

In some embodiments, the blends in accordance with the present disclosure are cation exchange selective, i.e., have a cation exchange selectivity of at least 80%.

In some embodiments, it has surprisingly been found that the electrodes, membranes, films, and coatings in accordance with the present disclosure are remarkably resistant to burning, i.e., have a low flammability even in the absence of additional flame retardant additives. In particular embodiments, the blends in accordance with the present disclosure are less flammable than the corresponding sulfonated block copolymers lacking the particulate carbon. Flammability of the materials can be assessed, e.g., using the UL 94 HB standard method.

The UL 94 HB (horizontal burn) method uses a specimen [length=125 mm (5 in), width=13 mm (0.5 in), thickness typically 1.5 mm (1/16 in) or 3.0 mm (1/8 in) or 6.0 mm (1/4 in)] held at one end in a horizontal position having marks at 25 mm (1 in) and 100 mm (4 in) from the free end. A flame is applied to the free end for 30 seconds or until the flame front reaches the 25 mm mark. If combustion continues the duration is timed between the 25 mm mark and the 100 mm mark. If combustion stops before the 100 mm mark, the time of combustion and the damaged length between the two marks are recorded. A set of three specimens is tested. To be rated 94 HB,
  the specimens may not have a burn rate exceeding 40 mm per minute over a 75 mm span for specimens having a thickness of 3.0 mm to 13 mm, or
  the specimens may not have a burn rate exceeding 75 mm per minute over a 75 mm span for specimens having a thickness less than 3.0 mm, or
  the specimens cease to burn before the flame reaches the 100 mm mark.

If one specimen from the set of three fails to comply, then a second set of three is tested. All three specimens of this second set must comply for the material to be rated 94 HB.

In some embodiments of the blends disclosed herein, specimens having a thickness of less than 3.0 mm have a burn rate of less than 75 mm per minute as determined using the UL 94 HB standard methods. In particular embodiments, each specimen has a burn rate of less than 70 mm per minute, or less than 60 mm per minute, or less than 50 mm per minute, or less than 40 mm per minute. In other particular embodiments, the specimens of the blend disclosed herein having a thickness of less than 1 mm, or of less than 0.5 mm, or of less than 0.1 mm, or of less than 0.05 mm, do not burn under the conditions of the UL 94 HB standard method.

Compared to the corresponding sulfonated block copolymers lacking the particulate carbon, in some embodiments the blends disclosed herein have a distinctly and significantly lower tendency to burn. This property, together with the capability to transport high amounts of water vapor and the dimensional stability of membranes comprising the blends, renders the membranes particularly suited for applications such as, e.g., energy recovery ventilation (ERV) applications.

Optionally, additional flame retardants can be added to the blends disclosed herein to further enhance or improve their resistance to burning. For example, non-halogen flame retardants may be employed as well as phosphorus containing compounds. Halogen flame retardants include bromine containing retardants. Other useful flame retardants known in the art may be used.

6. Applications of the Modified Block Copolymers

The blends described herein can be employed as membranes, films and coatings in a variety of applications and end uses, and their property profile renders them particularly suited as materials for membranes in applications which require dimensional stability when immersed in water or exposed to humid environment, good wet strength, good dimensional stability, good water and ion transport characteristics, good methanol resistance, easy film or membrane formation, good barrier properties, controlled flexibility and elasticity, adjustable hardness, thermal/oxidative stability, and low flammability.

Accordingly, in some embodiments, the membranes, films and coatings described herein, thus, advantageously can be employed in fuel cells, batteries, devices for energy storage, harvesting, and recovery, devices for reverse or forward electrodialysis, devices for controlling humidity, devices for pressure retarded, forward and reverse osmosis, devices for electro- and capacitive deionization, and devices for purifying or detoxifying gases or liquids.

In some embodiments, the membranes described herein are advantageously employed in device for energy storage, harvesting, or recovery. In some of these embodiments, the membranes comprises the at least one sulfonated block copolymer and carbon black in a weight ratio of the copolymer to the carbon black of from about 0.01 to about 0.5.

In one embodiment, the membranes described herein are particularly suited to serve as water vapor and heat exchange membranes in energy recovery ventilation (ERV) systems. ERV involves the sensible and latent heat exchange of exhaust inside air with fresh outdoor air. The basis for such exchange is that the exhaust air flow and the intake airflow will possess different water vapor pressures and will furthermore be at different temperatures. For example, in summer when the intake airflow is warm and humid, energy is recovered by exchanging water vapor (latent heat) and temperature (sensible heat) with cooler and low humidity exhaust air. Alternatively, in winter, when the outdoor air is cold and dry, energy is recovered by exchanging latent and sensible heat between the warmer and more humid exhaust air and the dryer and colder intake air.

ERV systems are usually employed in conjunction with a heating and/or cooling system, and are made up of a device having an ERV core unit. The core unit is generally comprised of various stacked membranes separated by some type of barrier. The intake and exhaust air streams are transported to the core unit and made to pass by one another on each side of the stacked membranes without intermixture.

Sensible heat exchange is generally simpler to accomplish since a thin layer barrier may transfer heat rather easily. On the other hand, latent heat transfer is achieved by the difference in humidity between the air streams. It is desirable for ERV systems to provide for both the efficient exchange of both sensible and latent heat of the various intake and exhaust air flows. Latent heat transfer depends on the difference in humidity of the incoming and exiting air and, thus, largely depends on the ERV membrane's ability to transport water vapor between the two airflow streams. The membranes disclosed herein are particularly suited to provide improved sensible heat transfer as well as improved latent heat transfer.

ERV systems generally employ a core unit having a stack of multiple moisture permeable membranes separated by spacers. Both the intake airflow streams as well as the exiting airflow streams are transported to the ERV core unit. Within the core unit, the air streams are separated by the membranes in the core unit as they flow past one another. Heat and moisture are exchanged between the two air streams due to the temperature and moisture gradient across the membrane.

Figure 4:
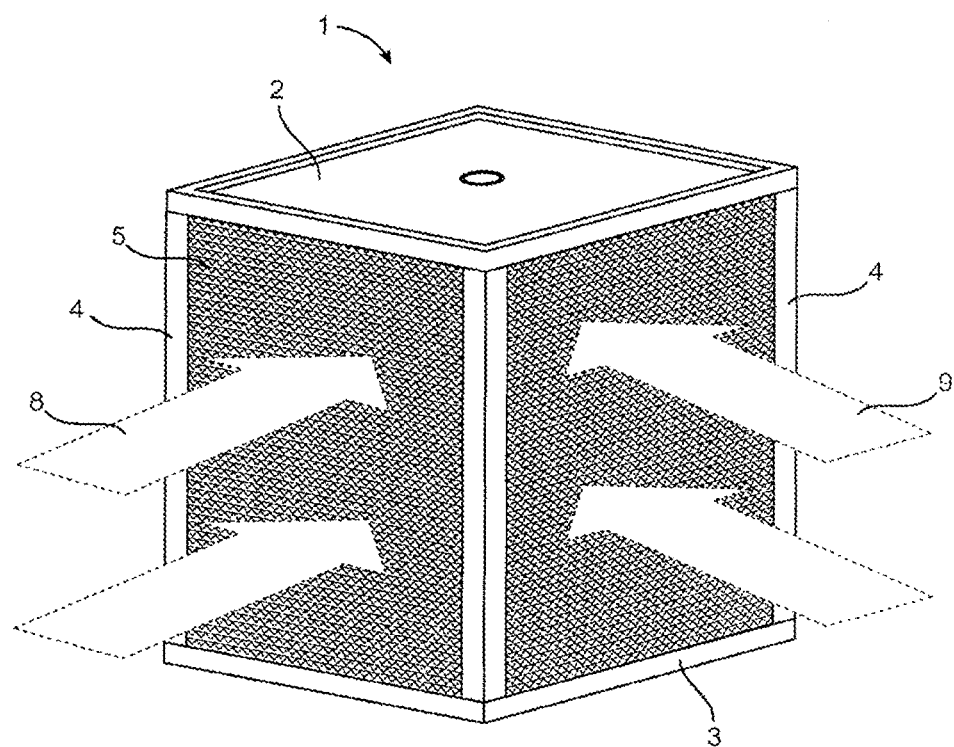
FIG. 4 schematically illustrates a perspective view of an energy recovery ventilation (ERV) core unit.

FIG. 4 schematically illustrates an ERV core unit (1). Accordingly, the unit comprises a housing made up of a top cover (2) and a bottom cover (3) with side supports (4). Within the housing is held exchange element (5) made up of a plurality of air exchange membranes separated by plurality spacer elements. The fresh intake air flow is represented by the arrows (8) and the exhaust air flow is represented by the arrows (9).

Figure 5:
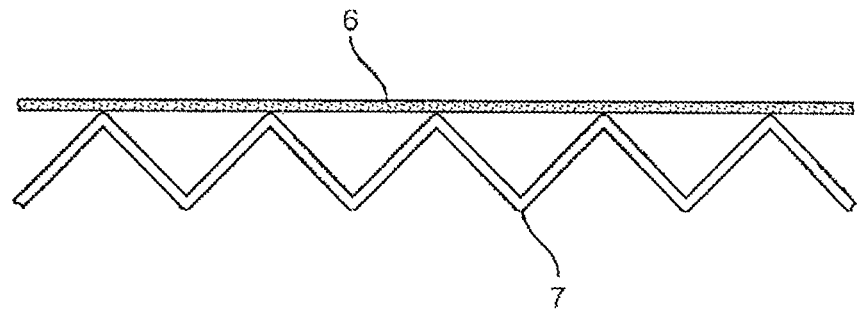
FIG. 5 schematically illustrates an air exchange membrane of an ERV core unit with a spacer element.

FIG. 5 illustrates the combination of an air exchange membrane (6) and a spacer element (7). Spacer elements (7) are configured to provide channels for airflow between multiple membranes (6). The size of such channels may be such as to provide an air gap from about 5 to 30 mm. In the embodiment shown in FIG. 5, the channels are provided by a spacer (7) having a rigid configuration having crests which form longitudinal apertures along the length of the spacers in one direction, and permitting air flow both above and below the spacer depending on the formation of the ridges. Such spacers may be made up of fiberglass, aluminum or plastic. Other materials may similarly be used which provide strength and maintain the membranes separated from each other, and permit and direct the airflow. The material of the ridged spacers should be such that both air and moisture is prevented from passing through the spacers themselves.

Figure 6:
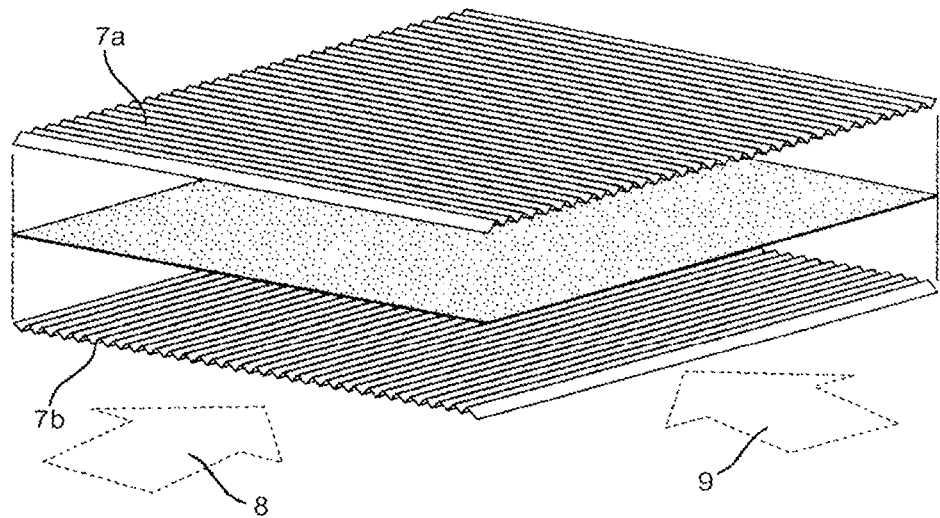
FIG. 6 schematically illustrates an air exchange membrane of an ERV core unit with spacer elements in a transverse configuration.

FIG. 6 illustrates a design in which ridged spacers are arranged in a transverse configuration. In this example, one set of spacers (7a) is arranged so that the air channels are aligned in one longitudinal direction, while a second set of spacers (7b) is arranged such that the air channels are aligned in a second longitudinal direction, with each set being stacked in alternating fashion. Accordingly, fresh intake air (8) may be passed through the spacer air channels in one direction, while the exhaust air (9) is passed through the spacer air channels in a second direction. Furthermore, as membranes are arranged on either side of the spacer elements (7), heat and moisture can be exchanged through the membrane without intermixture of the different air streams.

Figure 7:
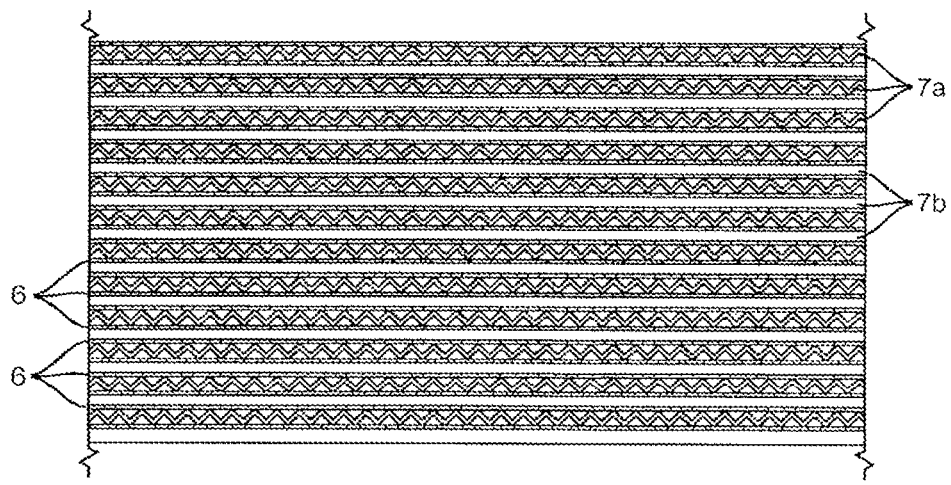
FIG. 7 schematically illustrates an arrangement of stacked membranes and spacer elements of an ERV core unit.

FIG. 6 shows the spacers (7a) and (7b) disassembled, whereas FIG. 7 illustrates the respective arrangement of spacers stacked one on top of the other as they would be in a core unit with membranes situated in between. ERV units having cores with ridged spacers are commercially available, e.g., from Innergytech. Additionally, for example U.S. Pat. No. 6,536,514 discloses a ridged spacer with a moisture permeable membranes.

Figure 8:
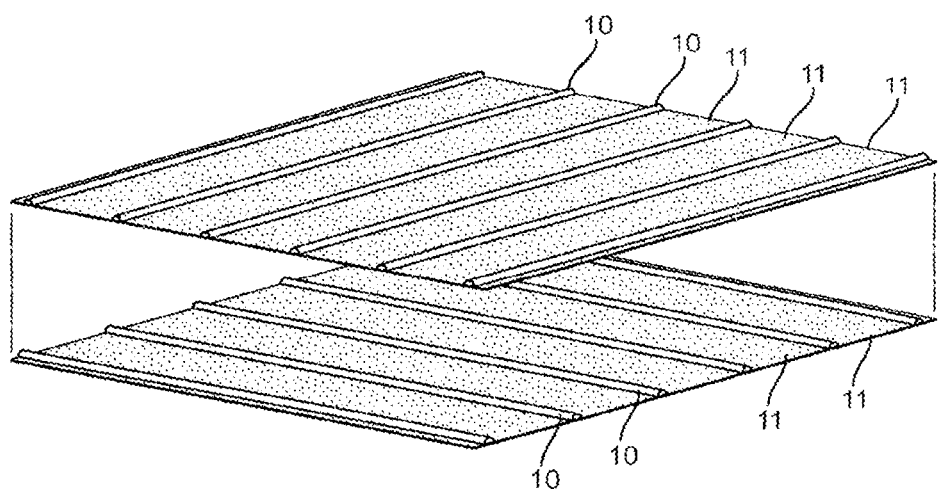
FIG. 8 schematically illustrates an air exchange membrane of an ERV core unit with elongate ribs as spacers.
Figure 9:
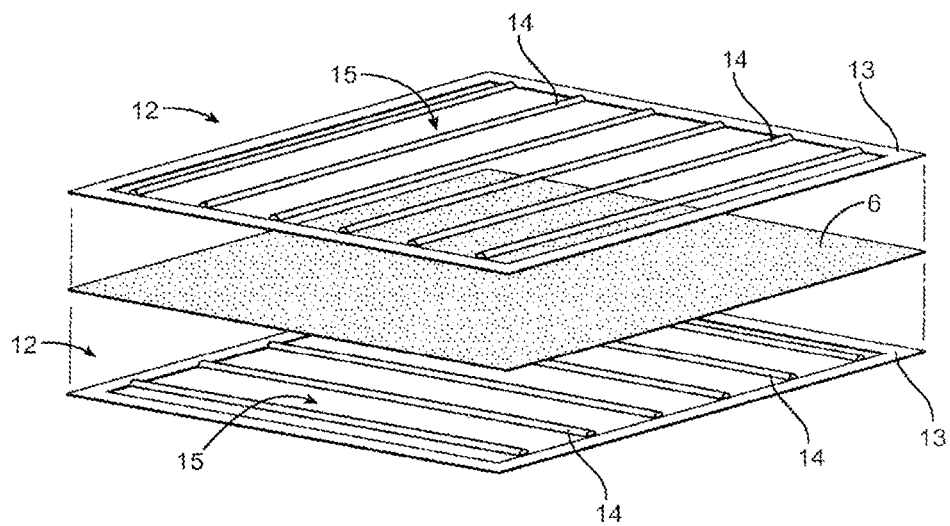
FIG. 9 schematically illustrates an air exchange membrane of an ERV core unit with spacers made up of plates.

Other types of spacers may be used. The spacers illustrated in FIG. 8 are made up of singular elongate ribs (10) adhered to the surface of membranes (11), and extend along the length of the core unit, with each successive layer alternating to form a cross flow pattern. In still other examples, as shown in FIG. 9, the spacers may be made up of a plate (12) which can be placed in between the membranes. Such plates may have an outer frame (13), with longitudinal partitions (14) spaced at a distance from one another. Such plates (12) may be made up of fiberglass, aluminum or plastic. A membrane (6) is situated between the plates (12), with the plates (12) being stacked in an alternating cross flow pattern. For example, in FIG. 9, the top plate extends in one direction while the lower plate extends in a second direction, which is perpendicular in the illustrative example. The partitions (14) form air channels (15) which direct the air streams flowing through the ERV unit. Apertures are placed in the side of the outer frame (13) to allow air to flow into the air channels (15).

In alternative designs, the spacers may have configurations other than longitudinal; i.e., they may be diagonal or jagged, or have other shapes. By adjusting the shape of the partitions the residence time of the air streams in the ERV core can be increased thereby improving heat and moisture exchange. Furthermore, such spacers can be stacked such that the intake and exhaust air streams have cross flows in any direction, for example transversely, right angles, or any non-parallel configuration. Further, parallel configurations can be employed as well so long as the gases are prevented from being intermixed as they enter or exit the core.

The spacers are provided in order to allow membrane surfaces to contact the intake and exhaust air flow streams one on each side of a membrane without intermixture thereof. The membranes allow transfer of heat and moisture between the air streams, thus allowing sensible as well as latent heat exchange. Accordingly, the ability to efficiently transfer heat and moisture greatly affects the effectiveness and efficiency of the ERV unit. ERV membranes made from sulfonated block copolymers but lacking the particulate carbon of the blends described herein are described in U.S. Publication No. 2012/0073791.

In some embodiments, the blends of the present disclosure have been found to provide membranes which surprisingly surpass ERV membranes made from the corresponding sulfonated block copolymer but lacking the particulate carbon both with regard to sensible and latent heat transfer. Moreover, membranes comprising the blends of the present disclosure surprisingly have been found to be advantageous due to being less flammable than ERV membranes made from the corresponding sulfonated block copolymer but lacking the particulate carbon. The membranes comprising the respective blends, further, are more dimensionally stable than the ERV membranes made from the corresponding sulfonated block copolymer but lacking the particulate carbon. Accordingly, in some embodiments, the membranes comprising the blends disclosed herein advantageously may be employed as ERV membranes as such. In alternative embodiments, the membranes comprising the blends disclosed herein may be employed as ERV membranes in form of laminates comprising a substrate layer.

The substrate layer which may be employed with the membrane may increase the mechanical strength and additionally may facilitate water vapor transport. Accordingly, it should be made of a porous material to allow moisture to pass through with as little resistance as possible while also providing additional support. Suitable porous substrates are in particular those known and used in the art, many of which are commercially available.

Accordingly, the substrate to be used with the membrane disclosed herein includes porous cellulosic fibrous materials as well as microporous films. Materials include, for example, fabrics, polymeric films and fibers, and cellulosic materials (such as paper). The substrate may be composed of natural and/or synthetic fibers. Fabrics include wovens, non-wovens, knits and cross-laid fabrics.

Further, the substrate may be composed of filaments, glass yarns, fiberglass, non-corroding metal fibers (such as nickel fibers), as well as well as carbon fibers. Synthetic fibers include polyolefins, polyethylene, polypropylene, and polyesters. Exemplary substrates also include polyvinylidene fluoride, polytetrafluoroethylene, nylon, polyethersulfone, polypropylene, polyamide, cellulose, cellulose nitrate, cellulose acetate, cellulose nitrate/acetate polytetrafluoroethylene, polyethylene terephthalate (PET), and polyether ether ketone (PEEK).

Additives or coatings (other than the membranes disclosed herein) may be added to the substrate to improve other properties. Such additives should not interfere with the effectiveness and efficiency of the ERV unit, or introduce any harmful components into the air streams. One type of additives is flame retardants which may be employed to inhibit or prevent fire or the spread of fire.

Biocides may also be applied, including fungicides, microbicides and bactericides, for preventing growth of molds, mildew, fungus, bacteria, viruses, and parasites as well as other biological organisms that may be harmful to humans or reduce the efficiency of the ERV unit.

The membranes disclosed herein may be laminated by processes generally known in the art. Advantageously, the blends will be formed into a membrane or film, optionally comprising other components, and will be joined with the porous substrate to form the laminate. Multiple methods are suited for laminating the membrane, or bonding the membrane, to the porous substrate. For example, lamination can be conducted by cold lamination or heat (thermal) lamination. Additionally, sonic bonding may be employed for lamination.

Heat lamination is carried out by contacting the membrane disclosed herein with the porous substrate under temperature and pressure thereby forming a bond between the two. The lamination can take place in a vessel such as an oven or other machine or apparatus which enables pressing of the membrane to the porous substrate. Generally the temperature may range from 35° C. to about 230° C., and the pressure may range from 100 to 7,000 psi. Residence time, or time subjected to the increased temperature and pressure may range from 30 seconds to 10 minutes. Thereafter, the laminate can be cooled at room temperature and ambient pressure. Various types of laminating assemblies known in the art can be employed to contact the membrane and the substrate under heat and pressure. Adhesives may also be used in heat lamination processes. Further, heat activated adhesives may be employed.

Lamination may be effected using a press having two flat metal platens that are each individually heated and contain thermometers for temperature validation. In addition, the two heated metal platens can be drawn together under adjustable pressure. The membrane disclosed herein can be placed on a substrate to be placed between the metal platens thus forming a two ply membrane. Two pieces of metal foil may be placed around this two ply arrangement and then put into the press under pressure. Typical operating conditions include temperatures from 65-230° C., and a pressure from 100-7000 psi, with residence times of approximately one to two minutes. Those having ordinary skill in the art will appreciate that temperature, pressure and residence time may be varied to achieve desired laminate bonding.

Figure 10:
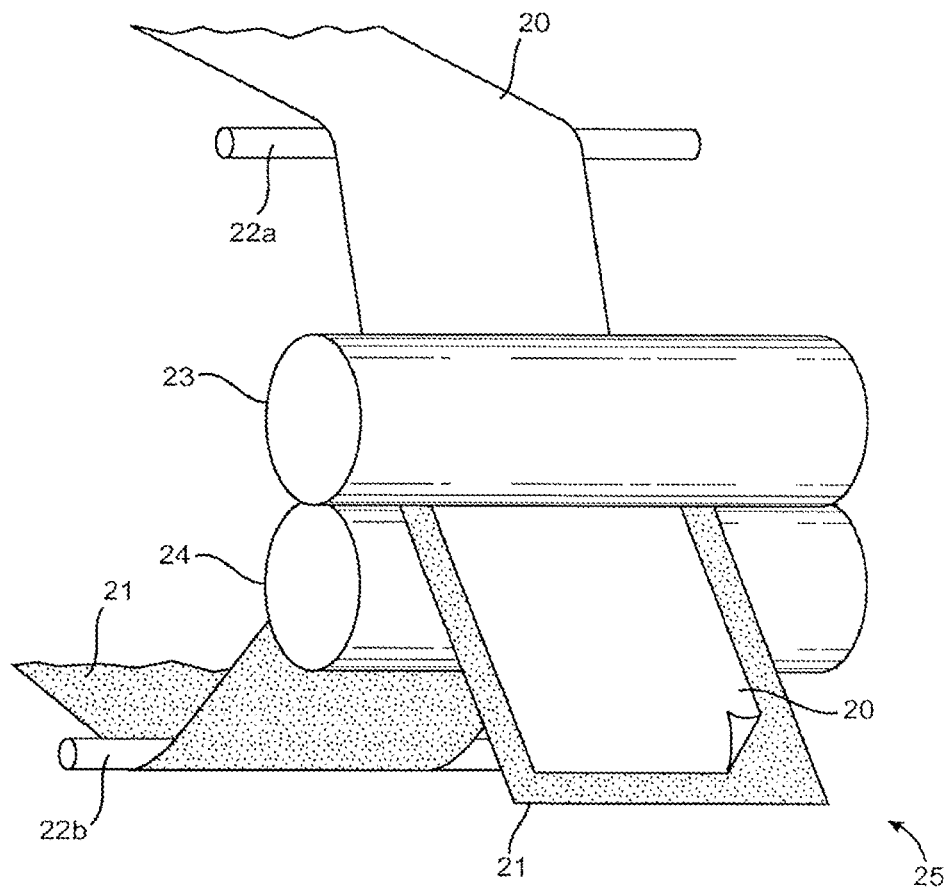
FIG. 10 schematically illustrates a roller assembly suited for laminating the membrane to a substrate.

Alternatively, lamination may be effected by means of a press-roller assembles, e.g., an assembly as shown in FIG. 10. Accordingly, the membrane (20) is fed past sub-rollers (22a) and between a top roller (23) and a bottom roller (24). A substrate (21) is also fed past sub-rollers (22b) and between the top roller (23) and the bottom roller (24). The membrane (20) and substrate (21) are pinched between the top roller (23) and bottom roller (24) thus bonding the membrane (20) to the substrate (21) and forming the laminate (25). Either one or both of the top roller (23) and the bottom roller (24) may be heated sufficient for bonding the membrane (20) to the substrate (21). Additionally, the rollers (23) and (24) can be separated or pushed together to adjust the pressure at which the lamination occurs. Temperatures may be from 65-230° C. and the pressure may be from 100-7000 psi. Furthermore, as the substrate (21) and membrane (20) are fed into the rollers, this allows for large quantities of laminated substrate to be produced. Line speeds may vary depending on temperature and pressure and the desired quality and quantity of the laminate.

Alternatively, the membrane and the substrate layer may be laminated by way of solvent bonding methods. This can be done under heat or room temperature. In this type of lamination, an organic solvent is applied to the membrane or a portion thereof for softening. The softened membrane is then pressed onto the substrate thereby forming a bond between the portions softened by the organic solvent and the substrate. Organic solvents may be used which have the effect of solvating portions of the membrane. Suitable organic solvents include, e.g., alcohols, alkanes, cycloalkanes, ketones, acetates, ethers, and aromatic solvents, such as toluene, and benzene.

Another method for lamination is cold lamination, which generally utilizes wet or dry adhesives. While labeled cold, such temperature includes room temperatures. Adhesive lamination is carried out by applying an adhesive to one side of the membrane and then contacting it with the porous substrate. However, the adhesive should be applied to cover a particular surface area of the substrate and polymeric film so as to minimize blockages which may prevent water vapor from passing through. Adhesives may have the effect of blocking certain pores of the substrate, thereby reducing efficiency. Accordingly, with adhesive lamination, it is preferable to minimize the area covered by the adhesive. The adhesive employed can be for example urethane or latex based.

In either cold or heated lamination, laboratory or commercial scale lamination assemblies may be used for laminating and bonding the membrane and the substrate. Suitable configurations for commercial scale lamination are known in the art and include rollers, presses, etc. The most prevalent in the art is the use of dual, heated pinch rollers.

When contacting the membrane with the porous substrate, measures can be taken to ensure that the membrane will be flat against the porous substrate. For example a lamination apparatus with rollers can be applied across the surfaces to flatten and remove bubbles. After lamination samples can be analyzed using Scanning Electron Microscopy (SEM) to evaluate the quality of the lamination.

The membranes disclosed herein generally can be employed as coatings of substrates which may be of natural or synthetic, woven or non-woven material, or a mixture thereof. Advantageously, the membranes comprising the blends may be employed as coatings for protective sheets, blankets, clothing or other garment, or equipment, adapted to protect against harm due to chemical or biological hazards. In such protective articles, the membranes disclosed herein provide a barrier of protection from various environmental elements (wind, rain, snow, chemical agents, biological agents) while offering a level of comfort as a result of their ability to rapidly transfer water vapor from one side of the membrane to the other, e.g., allowing moisture from perspiration to escape from the surface of the skin of the wearer to the outside of the membrane or fabric and vice versa. Full enclosure suits provided with the coatings disclosed herein may protect first responders at the scene of an emergency where exposure to smoke, a chemical spill, or various chemical or biological hazards are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. No. 6,537,538, U.S. Pat. No. 6,239,182, U.S. Pat. No. 6,028,115, and U.S. Pat. No. 5,925,621 where it is noted that polystyrene sulfonates act as inhibitory agents against HIV (human immunodeficiency virus) and HSV (herpes simplex virus). The protective effect is further enhanced due to the presence of the particulate carbon in the blends, and due to the low tendency of the blends to burn.

In personal hygiene applications, the membrane disclosed herein advantageously transports water vapor from perspiration while providing a barrier to the escape of other bodily fluids while retaining its strength properties in the wet environment. The use of this type of materials in diapers and adult incontinence constructions would be improvements over existing technologies.

In a further embodiment of the present invention, the membranes comprising the blends may be used in electrochemical applications, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The membranes comprising the blends are also used as desalination membranes, and as coatings on porous membranes. Their selectivity in transporting gases makes them useful for gas separation applications.

Figure 11:
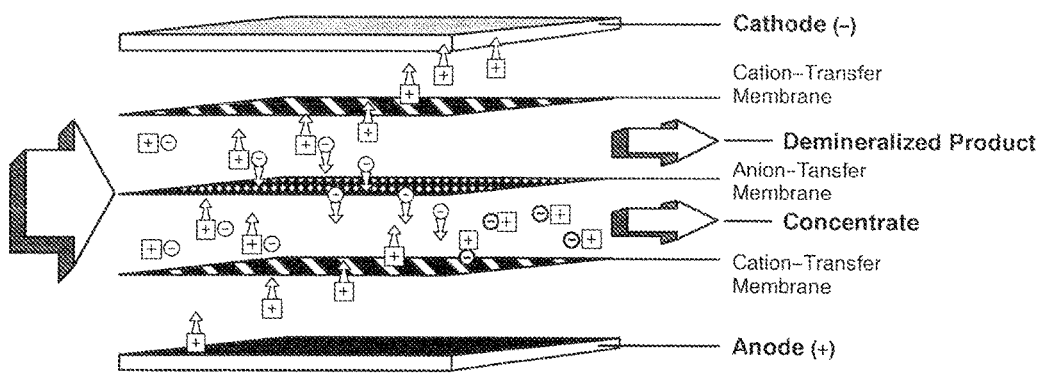
FIG. 11 schematically illustrates a desalination cell.

In some embodiments, the blends are particularly advantageously employed in a membrane for an electro-deionization assembly which comprises at least one anode, at least one cathode, and one or more membranes. Electro-deionization assemblies include, in particular, desalination cells. An illustrative representation of a desalination cell is set forth in FIG. 11.

To be useful in an electrically driven desalination application, a membrane which transports cations is needed to transportions that are attracted to the negatively charged electrode. This membrane must reject anions (cationic membrane). Each cell also needs a membrane which transports anions in the direction of the positively charged electrode (anionic membrane). It is important that the anionic membrane does not transport cations; a high level of selectivity of the membranes for anions and cations, respectively, is important for the efficient use of electricity in these devices. In addition to being well matched to the cationic membrane in electrical properties, the anionic membrane also must be similar to the cationic membrane in mechanical properties.

In some embodiments, the membranes comprising the blend disclosed herein are particularly suited as cationic membranes. In particular applications the cationic membranes comprising the blends may advantageously be paired with at least one anionic membrane. Anionic membranes which are suited to be paired with the cationic membranes disclosed herein in particular include anion-exchange membranes which comprise a modified sulfonated block copolymer such as, e.g., addressed in co-pending U.S. Publication No. 2013/0015071.

In some embodiments, the membrane comprising the blend disclosed herein is particularly suited as an electrode or as a film or coating applied to the surface of a carbon electrode. In some of these embodiments, the particulate carbon component of the blend preferably is or comprises activated carbon which is impregnated with one or more catalytic metals of Groups 8, 9, 10, and 11, of the Periodic Table of the Elements as in general and in particular hereinbefore mentioned. In other of these embodiments, the particulate carbon component of the blend preferably is or comprises activated carbon which is not impregnated, or is pure, i.e., particulate carbon which does not comprise a catalytic metal and which does not comprise components differing from carbon other than those commonly present as impurities in commercial, non-impregnated carbon powders.

In particular embodiments, the membrane comprising the blend disclosed herein may be paired with, and laminated or coated onto, a proton exchange membrane to form an assembly suited, e.g., for use in proton exchange membrane fuel cells (PEMFCs).

In PEMFCs, the electrodes are bonded to a solid polymer electrolyte, which is in the form of a thin membrane, to form a single integral unit, known as the membrane electrode assembly (MEA). It has been found that the supported catalyst gas diffusion electrodes, as developed for the liquid electrolyte fuel cells, are in general unsuitable for use with PEMFCs as only very low current densities are usually attainable. This is because very little of the metal catalyst (generally a platinum catalyst) surface is present at the three-phase interface, where the membrane electrolyte is in direct contact with metal catalyst surface and an adjacent gas pore. This occurs most readily at the front surface of the electrode where contact with the membrane occurs. Very little of the thickness of the electrode is used because the electrolyte does not penetrate into the thickness of the electrode. State of the art PEMFC stacks therefore utilize electrodes containing unsupported platinum black with relatively high noble metal loadings, typically 4 mg/cm$^2$ per electrode, in order to maximize the level of metal contact at the front face of the electrode. This represents a catalyst loading about ten times higher than the catalyst loading used on the carbon-supported catalyzed gas diffusion electrodes. It is believed that the amount of metal surface utilized in these PEMFC electrodes is around 3% of the total available metal surface area on the electrode. Despite the low metal utilization, the performance of the state of the art PEMFCs is high compared to liquid electrolyte fuel cells. Current densities of 500 mA/cm$^2$ at 0.72V, with $H_2$/air as reactants, at a temperature of 80° C. and a pressure of 5 atm, have been reported, whereas the liquid electrolyte fuel cells usually operates at only 200-300 mA/cm$^2$. However, these state of the art PEMFC electrodes require close to 20 g/kW of platinum. For reasons of cost it is widely accepted that the required amount of metal catalyst needs to be reduced to levels of about 0.5 g/kW and below for the PEMFC to become a viable system for applications such as transportation.

Membrane electrode assemblies (MEAs) for PEMFCs generally are formed by coating a gas diffusion electrode containing platinum with a membrane made from a perfluorocarbon copolymer marketed by E. I. duPont, under the trade mark NAFION®, e.g., U.S. Pat. No. 4,876,115, U.S. Pat. No. 5,084,144. In general, the MEAs are produced by processes involves fabricating a gas diffusion electrode from non-impregnated high surface area carbon black, followed by impregnation of a solution of solubilized NAFION® polymer. The platinum catalyst is then applied in a subsequent stage via electrodeposition of platinum onto the pre-formed electrode from a platinum plating bath solution. Alternatively, very thin films of catalyst layers may be cast directly onto membrane electrolytes from inks comprising the carbon supported platinum catalyst and solubilized NAFION®.

In PEMFCs, as in any fuel cell, the rates of the electrode reactions depend on a number of factors, but the most important is the total effective surface area of the catalyst which is present at the interface between the reactant gas and the electrolyte. The problems at the electrolyte/electrode interface of a fuel cell are complex.

During the operation of the fuel cell, the hydrogen ions (protons) which are formed at the anode/electrolyte interface migrate through the electrolyte membrane to the cathode catalyst. Once they reach the cathode electrode/electrolyte interface, the protons must come in contact with a reactive catalytic site on the cathode electrode where, in the presence of the oxidant, the protons are oxidized. In the case of oxygen as the oxidant water is formed. In order for the cathode electrode to operate properly, it must possess certain physical properties. It must be gas permeable to permit the oxidant to pass through it to the electrode/electrolyte interface. It must further be electrically conductive and it must permit easy removal of the product water associated with the cathode reaction.

The gas permeability of certain embodiments of the blends addressed herein, paired with their electrical conductivity and low water uptake renders these materials particularly suited as electrode materials. Accordingly, in some embodiments disclosed herein, the blends are employed as electrode materials for fuel cells. In particular embodiments, the blends employed as electrode materials have a ratio of the particulate carbon to the sulfonated block copolymer of at least 1:1, more preferably at least 4:1, or at least 10:1, or at least 20:1, or at least 100:1.

The electrodes comprising the blends disclosed herein may be employed as anode or cathode, and the particulate carbon contained in the blends may be non-impregnated or may be impregnated with one or more catalytic metals. Suitable catalytic metals include all metals of the transition metal groups, i.e., Groups 3-12 of the Periodic Table of the Elements. In some embodiments, the catalytic metal is a metal of Groups 4-11 of the Periodic Table of the Elements. In further embodiments, the catalytic metal is a metal of Groups 8, 9, 10, and 11, of the Periodic Table of the Elements as in general and in particular hereinbefore mentioned.

In alternative embodiments the blends disclosed herein are coated to the surface of a conventional electrode to facilitate proton transport and to increase the total effective surface area of the catalyst/electrode at the interface between the reactant gas and the electrolyte. In particular embodiments, the conventional electrode is a carbon electrode.

In some embodiments, the blends disclosed herein are employed as membranes and/or electrodes in MEAs. Those having ordinary skill in the art will appreciate that the blends disclosed herein which are suited as a membrane of the MEA, generally, will differ from the blends which are employed in the electrode in that the bends used as membranes in such assemblies normally will have a ratio of the particulate carbon to the sulfonated block copolymer of at most 1:1, more preferably at most 0.5:1, or at most 0.25 or at most 0.01:1.

In alternative embodiments, the blends disclosed herein are employed as an electrode, or as an electrode coating, of a MEA wherein the blend is coated onto a proton exchange membrane substrate, or is sandwiched between the electrode surface and the surface of the proton exchange membrane. In particular embodiments, the proton exchange membrane of the MEA comprises ($a_1$) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol-% sulfonic acid or sulfonate functional groups based on the number of monomer units of the B block; and (c) optionally a liquid constituent, e.g., water, wherein the sulfonated block copolymer ($a_1$) of the proton exchange membrane substrate and the sulfonated block copolymer (a) of the blend may be identical or different, and wherein the proton exchange membrane substrate is free of particulate carbon. Suitable proton exchange membranes in such MEAs in particular include membranes made of the sulfonated block copolymers described in general and in particular in, e.g., U.S. Pat. No. 8,012,539, U.S. Pat. No. 7,737,224, U.S. Pat. No. 5,516,831, U.S. Pat. No. 5,239,010, and US 2010/0048817.

7. Examples

The following examples are intended to be illustrative only, and are not intended to be, nor should they be construed as, limiting the scope of the present invention in any way.

a. Materials and Methods

The WVTR (inverted cup) as described herein was measured similar to ASTM E 96/E96M. The ASTM method was modified by using a smaller vial, employing 10 ml of water, and having an area of exposed membrane of 160 mm$^2$ (as opposed to 1000 mm$^2$ according to the ASTM method). After adding the water and sealing the vial with the membrane test specie, the vial was inverted, and air having a temperature of 25° C. and a relative humidity of 50% was blown across the membrane. Weight loss was measured versus time, and the water transport rate was calculated on the basis of the measurements as g/m$^2$, or as g×mil/m$^2$ when normalized for thickness of the tested membrane.

The WVTR (upright cup) as described herein was measured correspondingly, with the difference that the vial was not inverted.

The degree of sulfonation as described herein and as determined by titration was measured by the following potentiometric titration procedure. The sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by $^1$H-NMR was measured using the following procedure. About two (2) grams of sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-d$^8$ (THF-d$^8$), to which was then added with a partial drop of concentrated H$_2$SO$_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

The formation of micelles was confirmed by particle size analysis on a Malvern Zetasizer Nano Series dynamic light scattering instrument, model number ZEN3600, available from Malvern Instruments Limited, UK, using polymer sample solutions diluted to a concentration of about 0.5 to 0.6%-wt. with cyclohexane. The diluted polymer solution samples were placed in a 1 cm acrylic cuvette and subjected to the instrument's general purpose algorithm for determining the size distribution as a function of intensity (see, A. S. Yeung and C. W. Frank, *Polymer*, 31, pages 2089-2100 and 2101-2111 (1990)).

The area resistance can be determined by direct current (DC) measurements or by alternating current (AC) measurements. Resistance measured by DC is typically higher than resistance measured by AC, because resistance measured by DC includes boundary layer effects. Since boundary layer effects always exist in praxis, resistance data from DC method more closely represent the praxis performance.

Figure 2:
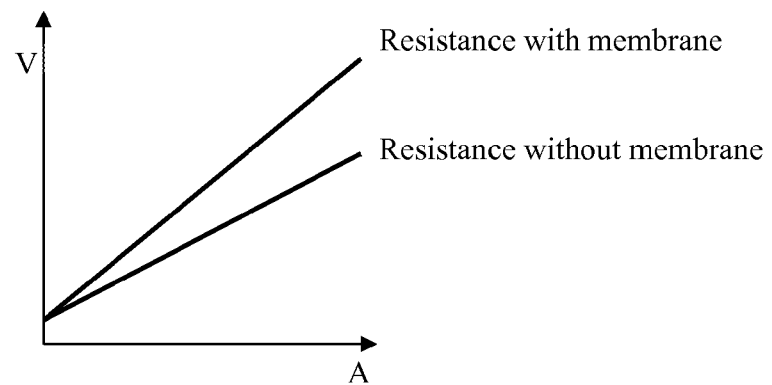
FIG. 2 illustrates how to obtain membrane resistance from measurements taken in a set-up according to FIG. 1.

The membrane resistance was measured by a direct current method using a set-up as illustrated in FIG. 1. The potential drop between the Haber-Luggin capillaries was measured with and without the membrane as a function of the current density. The resistance was determined from the slope of voltage vs. current. To obtain the membrane resistance, the resistance without the membrane was subtracted from the resistance with the membrane. FIG. 2 illustrates how to obtain membrane resistance. Membrane resistance is the difference in the slopes.

Membrane area resistance is dependent on thickness. Therefore, area resistance of membranes which differ in thickness cannot be compared. To obtain true membrane properties, membrane conductivity is often used. Membrane conductivity was calculated by dividing the membrane thickness by membrane area resistance.

"True" membrane permselectivity should be based on the measurement of ion concentration changes of both concentrate and dilute solutions by measuring the amount of current passing through the electrodialysis system. But this method is time consuming.

An alternative method is measuring "apparent" permselectivity, which is based on the measurement of the potential gradient across a membrane separating two electrolyte solutions of different concentrations. It is worthy to point out that the apparent permselectivity is always larger than the real permselectivity because it does not take boundary layer effects into account. However, the difference is generally small. The experiment set-up is schematically shown in FIG. 3.

The potential between two electrolyte solutions of different concentrations, i.e. membrane potential ($\varphi_m$) was measured using a voltmeter. Membrane potential ($\varphi_m$) can be expressed by the following equation:

$$\varphi_m = (2T_{cou} - 1)\frac{RT}{F} \operatorname{Ln}\frac{a1}{a2}$$

where $T_{cou}$ is the membrane transport number of the counter-ions, a1 and a2 are the activity of the two KCl solutions, R is the gas constant, and T is the temperature, and F is the Faraday constant. For a strictly permselective membrane (where $T_{cou}$ is 1), membrane potential is following:

$$\varphi_{m,sp} = \frac{RT}{F}\operatorname{Ln}\frac{a1}{a2}$$

The apparent permselectivity of a membrane ($\psi$), when measured in KCl solutions, is given by the following equation:

$$\psi = \frac{\varphi_m}{\varphi_{m,sp}}$$

In the example above, one side of the membrane is 0.1M KCl, the other side of the membrane is 0.5M KCl, and $\varphi_{m,sp}$ is 36.2 mV. Therefore, the apparent permselectivity of a membrane can be calculated according to following equation:

$$\psi = \frac{\text{Measured } \varphi_m \text{ in mV}}{36.2 \text{ mV}}$$

Of course, other solutions and concentrations can be used too. But corrections need to be made for different concentrations as well as for difference in ion mobility in solutions.

Figure 12:
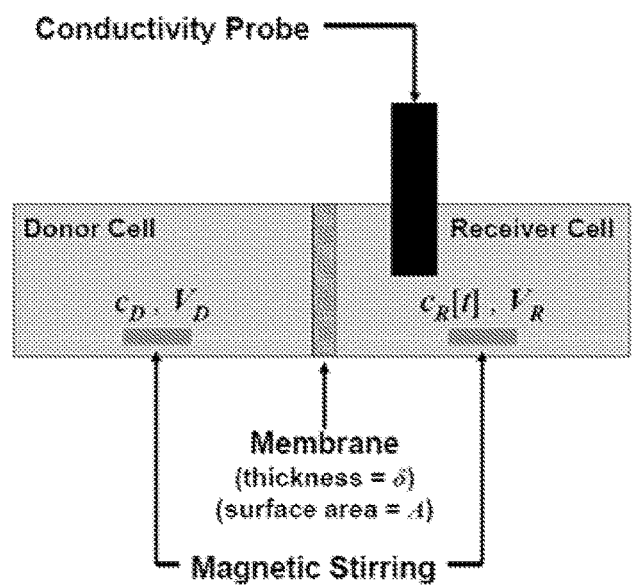
FIG. 12 schematically illustrates the experiment set-up for measuring the permeability.

The experimental set-up for measuring salt permeability is shown in the FIG. 12. The membrane was sandwiched between two cells: donor cell and receiving cell. The donor cell contained a salt solution with known concentration, and the receiving cell contained pure water at the start of the experiment. As salt permeated through the membrane from the donor cell to the receiving cell, the salt concentration in the receiving cell increased, and it was monitored by a conductivity probe over the time.

Salt permeability can be deducted from following equation, where $P_s$ is the salt permeability, t is the time, $V_R$ is the volume of the cells, $\delta$ is the membrane thickness, A is the membrane area, $C_D[O]$ is the starting salt concentration in the donor cell, and $C_R[t]$ is the salt concentration over the testing time in the receiving cell.

$$\ln\left[1 - \frac{2c_R[t]}{c_D[0]}\right]\left(\frac{-V_K\delta}{2A}\right) = P_s t$$

For some membranes, $P_s$ is dependent on the starting salt concentration ($C_D[0]$), therefore, $C_D[O]$ is often reported along with $P_s$. In our test, $C_D[O]$ was 2000 ppm NaCl.

b. Preparation Examples

Preparation of Sulfonated Block Copolymers

A pentablock copolymer having the configuration A-D-B-D-A was prepared by sequential anionic polymerization where the A blocks are polymer blocks of para-tertbutylstyrene (ptBS), the D blocks were comprised of polymer blocks of hydrogenated isoprene (non-hydrogenated: Ip; hydrogenated: E/P), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS pentablock copolymer was then hydrogenated using a standard $CO^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride). The resulting sulfonated block copolymer was found, by potentiometric titration, to have an "Ion Exchange Capacity (IEC)" of 2.0 meq of —$SO_3H$/g of polymer. The solution of sulfonated polymer had a solids level of about 10% wt/wt in a mixture of heptane, cyclohexane, and ethyl i-butyrate. The sulfonated block copolymer is hereinafter referred to as SBC-2.0.

Corresponding solutions of a sulfonated block copolymer having an IEC of 1.5 meq of —$SO_3H$/g of polymer (SBC-1.5) and of a sulfonated block copolymer having an IEC of 1.0 meq of —$SO_3H$/g of polymer (SBC-1.0) can be prepared in a similar manner.

Preparation of Blends

Carbon black was used as received. The powder was stated to have an average particle size of 20 microns.

Example 1

Carbon black (100 g) was weighed into a glass vessel. Cyclohexane (250 g) was poured over the powder affording a thick mixture having the texture of mud. A solution of SBC-2.0 (10% wt. in a cyclohexane/heptane solvent mixture) (62.3 g of solution, about 6.23 g of SBC-2.0) was added to the mixture of carbon black and cyclohexane. The vessel containing the resulting dispersion was placed on a mechanical shaker and agitated for 2 hours. Surprisingly, the resulting uniform suspension was noticeably lower in viscosity than the starting carbon powder/cyclohexane mud. The suspension obtained in this manner contained about 2.0% wt. of SBC-2.0 and about 32% wt. of carbon black. The weight ratio of SBC-2.0 to carbon black was about 0.0623.

Example 2

An aliquot of the suspension obtained in Example 1 (207.3 g suspension, 4.14 g SBC-2.0, 66.3 g carbon black) was transferred to a new container. Additional SBC-2.0 solution (31.6 g solution, about 3.16 g SBC-2.0) was added to the suspension aliquot in the new container. The vessel containing the new suspension was placed on a mechanical shaker and agitated for 2 hours. The viscosity of this new suspension was noticeably lower than had been observed for the Example 1 suspension. The suspension obtained in this manner contained about 3.1% wt. of SBC-2.0 and about 28% wt. of carbon black. The weight ratio of SBC-2.0 to carbon black was about 0.110.

Example 3

An aliquot of the suspension obtained in Example 2 (119.3 g suspension, 3.65 g SBC-2.0, 33.1 g carbon black) was transferred to a new container. Additional SBC-2.0 solution (32.2 g solution, about 3.22 g SBC-2.0) was added to the suspension aliquot in the new container. The vessel containing the new suspension was placed on a mechanical shaker and agitated for 2 hours. The viscosity of this new suspension was noticeably lower than had been observed for the Example 2 suspension. The suspension obtained in this manner contained about 4.5% wt. of SBC-2.0 and about 22% wt. of carbon black. The weight ratio of SBC-2.0 to carbon black was about 0.208.

Example 4

An aliquot of the suspension obtained in Example 3 (75.7 g suspension, 3.43 g SBC-2.0, 16.5 g carbon black)) was transferred to a new container. Additional SBC-2.0 solution (31.9 g solution, about 3.19 g SBC-2.0) was added to the suspension aliquot in the new container. The vessel containing the new suspension was placed on a mechanical shaker and agitated for 2 hours. The viscosity of this new suspension was noticeably lower than had been observed for the Example 3 suspension. The suspension obtained in this manner contained about 6.1% wt. of SBC-2.0 and about 15% wt. of carbon black. The weight ratio of SBC-2.0 to carbon black was about 0.401.

Example 5

An aliquot of the suspension obtained in Example 4 (53.8 g suspension, 3.31 g SBC-2.0, 8.25 g carbon black)) was transferred to a new container. Additional SBC-2.0 solution (31.5 g solution, about 3.15 g SBC-2.0) was added to the suspension aliquot in the new container. The vessel containing the new suspension was placed on a mechanical shaker and agitated for 2 hours. The viscosity of this new suspension was noticeably lower than had been observed for the Example 4 suspension. The suspension obtained in this manner contained about 7.6% wt. of SBC-2.0 and about 9.6% wt. of carbon black. The weight ratio of SBC-2.0 to carbon black was about 0.783.

Examples 6-11 were conducted correspondingly. The composition data of the blends obtained in Examples 1-11 are compiled in the following Table 1:

TABLE 1

Composition of Blends according to Examples 1-11

| | SBC-2.0 Content [% wt.] | Carbon Black Content [% wt.] | Weight Ratio of Carbon:SBC-2.0 |
|---|---|---|---|
| Example 1 | 5.9 | 94.6 | 16.03 |
| Example 2 | 9.9 | 89.1 | 9.00 |
| Example 3 | 17.1 | 82.9 | 4.85 |
| Example 4 | 28.6 | 71.4 | 2.50 |
| Example 5 | 43.9 | 56.1 | 1.28 |
| Example 6 | 67.1 | 32.9 | 0.50 |
| Example 7 | 80.5 | 19.5 | 0.25 |
| Example 8 | 87.4 | 12.6 | 0.15 |
| Example 9 | 91.2 | 8.8 | 0.10 |
| Example 10 | 95.8 | 4.2 | 0.05 |
| Example 11 | 99.0 | 1.0 | 0.01 |

Example 12

The suspensions obtained in Examples 2-4 were cast into solid films by pouring an aliquot of the suspensions into an aluminum pan and allowing the solvent to evaporate at room temperature. The suspensions obtained in Exampled 5-11 were cast on a Mylar release surface using a 10 mil doctor blade. The suspensions dried into uniform films. The water vapor transmission rate of the films obtained from the blends in accordance with Examples 1-5 was investigated using the inverted cup method. The water vapor transmission rate of the films obtained from the blends in accordance with Examples 6-11 was investigated using the upright cup method. The data are compiled in the following Tables 2a and 2b.

TABLE 2a

WVTR (Inverted Cup)

| | Weight Ratio of Carbon:SBC-2.0 | WVTR [$l/m^2/day$] | Membrane Thickness [micron] |
|---|---|---|---|
| Example 1 | 16.03 | nd | nd |
| Example 2 | 9.00 | nd | nd |
| Example 3 | 4.85 | nd | nd |
| Example 4 | 2.50 | 23 | 245 |
| Example 5 | 1.28 | 28 | 125 | nd = not determined

TABLE 2b

WVTR (Upright Cup)

| | Weight Ratio of Carbon:SBC-2.0 | WVTR [$g/m^2/day$] | Membrane Thickness [micron] |
|---|---|---|---|
| Example 6 | 0.50 | nd | nd |
| Example 7 | 0.25 | 1002 ± 25 | 29.4 |
| Example 8 | 0.15 | 813 ± 44 | 29.4 |
| Example 9 | 0.10 | 853 ± 19 | 28.2 |
| Example 10 | 0.05 | 736 ± 2 | 25.7 |
| Example 11 | 0.01 | 801 ± 18 | 29.4 |
| SBC-2.0 | n/a | 626 ± 32 | 20.8 | nd = not determined;
n/a = not applicable

Example 13

The membrane of Example 7 and the comparative membrane of SBC-2.0 were tested for flame retardance in accordance with UL 94HB. The test results are compiled in the following Table 3.

TABLE 3

Flame Retardance (US 94HB)

| | Weight Ratio of Carbon:SBC-2.0 | UL 94 HB | Membrane Thickness [micron] |
|---|---|---|---|
| Example 7 | 0.25 | does not burn | 83.8 |
| SBC-2.0 | n/a | total burn in 9 sec | 12.7 | nd = not determined;
n/a = not applicable c. Results and Discussion

As mentioned in the foregoing experimental section, combining cyclohexane with carbon black afforded a mixture having a mud like texture. As cyclohexane does not interact strongly with carbon black, the mixture had a slurry-like consistency, similar to sand in water. Addition of a small amount of SBC-2.0 in a cyclohexane/heptane solvent system to the slurry surprisingly yielded a low viscosity, stable suspension of the carbon particles (Example 1). The suspension was uniform in consistency and unexpected low in viscosity.

As reported, e.g., in US 20100048817, the sulfonated block copolymer SBC-2.0 is present in a cyclohexane/heptane solvent system in form of micelles. The sulfonated polystyrene segment is not soluble in this solvent mixture; this segment of the block copolymer thus occupies the center of the micelle and contains little or no solvent. The poly-t-butylstyrene (tBS) end segments and the hydrogenated isoprene (E/P) connecting segments are quite soluble in this solvent and form the solvated corona of the micelle.

Currently, it is not understood how the sulfonated block copolymer interacts with the carbon particles to afford the stable suspensions. It is clear, however, that there is a strong interaction between the sulfonated block copolymer and the carbon particles which interaction affects the rheology of the mixture. Even at the lowest polymer content investigated (less than 6%-wt. of the sulfonated block copolymer; more than 94%-wt. carbon), the suspension was stable.

Surprisingly, also, was the observation that the addition of more SBC-2.0 solution further significantly reduced the viscosity of the suspension. The final adjustment of the SBC-2.0 to carbon black ratio (Example 5) exhibited the lowest viscosity; this blend had an SBC-2.0 to carbon black ratio of about 44 to 56% (wt/wt).

An aliquot of the suspensions described in Table 1, Example 1 through Example 5, was dried down in a small aluminum pan to afford composites of SBC-2.0 and carbon black. The thickness of these composites varied from about ⅛ to ¼ of an inch (about 3 to 6 mm). The composites obtained from the suspensions of Examples 1 through 3 developed cracks during drying. It is possible that these materials did not contain sufficient amounts of the SBC-2.0 to hold the carbon black particles together during the drying process. Possibly, more intense mixing, higher amounts of solvent, and/or slower evaporation of the solvent from the composite, is necessary to improve homogeneity of the suspension to reduce material stress resulting from differences in solvent content during evaporation. The samples obtained using the suspensions of Examples 4 and 5 were uniform in appearance and did not exhibit any cracks.

Additionally, each of the suspensions of Examples 1 through 5 was cast onto a Mylar (siliconized release surface) film affording dry castings that ranged in thickness from about 5 mil to about 10 mil. For the dry materials cast from the suspensions of Examples 1 through 3, solid, carbon filled membranes were formed which showed areas (river-like regions in appearance) that were clear, and apparently lacked carbon black. The bulk of these membranes was black in appearance from the presence of the carbon particles but there were vein-like structures in the membrane which were clear and transparent reminiscent of membranes made from SBC-2.0 lacking the carbon component. At present, the lack of uniformity of the distribution of carbon black in these composites is not understood. However, it appears possible that prolonged and/or more intense mixing, or an increase of the relative amount of the solvents may be necessary to fully homogenize the suspensions having a carbon to sulfonated block copolymer ratio in excess of about 450.

Figure 13:
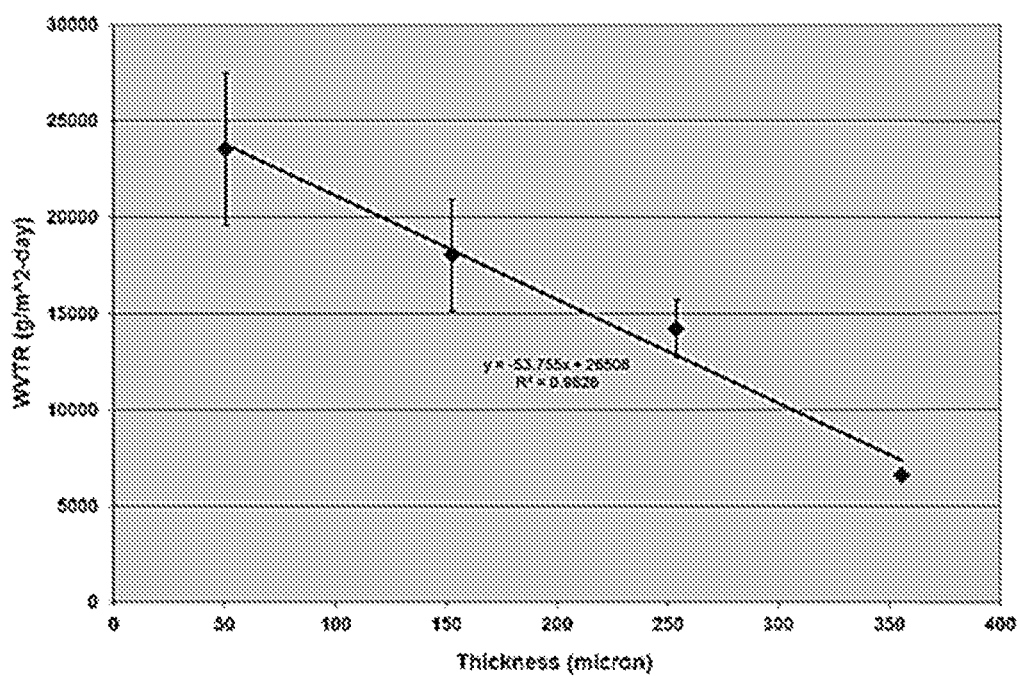
FIG. 13 illustrates the effect of membrane thickness on WVTR for membranes made from a sulfonated block copolymer lacking the particulate carbon.

The suspensions obtained in Examples 4 and 5 were cast into films which were uniformly black in appearance. The dried membranes appeared to by uniform in thickness and carbon black content, as well. The water vapor transport rates, WVTR, for these membranes were surprisingly high (see Table 2a). The membrane of Example 4 had a thickness of 245 microns. However, despite the thickness, the membrane transported water at a rate of 23 $l/m^2/day$. For comparison, a 25 micron thick membrane cast from just SBC-2.0 but lacking the carbon constituent had a WVTR value of 25 $l/m^2/day$. Although the composite membrane of Example 4 was 10 times thicker than the membrane cast from SBC-2.0 but lacking the carbon, the composite membrane had essentially the same water transport rate. Investigations into the properties of SBC-2.0 membranes lacking the carbon component have shown that the WVTR of such membranes varies inversely with membrane thickness over the range 50<thickness (micron)<350. The respective results are shown graphically in FIG. 13. On this basis, it would have been expected that the composite membrane at a thickness of 245 microns would exhibit a WVTR value of only around 14 $l/m^2/day$. With a measured WVTR of the composite membrane of 23 $l/m^2/day$, the WVTR thus is higher by a factor of about 1.6 than the expected WVTR. Clearly the presence of the carbon black in the membrane according to Example 4 significantly enhanced the water vapor transport rate as compared to a membrane of SBC-2.0 having the same thickness.

Similarly, the membrane obtained from the suspension of Example 5 was surprisingly effective in transporting water. The membrane at a thickness of about 125 microns had a WVTR value of about 28 $l/m^2/day$. Based on FIG. 13, it can be seen that a membrane of that thickness made from SBC-2.0 without the particulate carbon would have afforded a WVTR value of less than 19 $l/m^2/day$. Again, surprisingly the presence of carbon black in the membrane increased the transport of water through the composite membrane significantly.

A corresponding increase in the water vapor transmission rate was also observed when the membranes according to Examples 7 through 11 were investigated using an upright cup set-up. The respective membranes were cast onto from a Mylar (siliconized release surface) film at roughly 1.0 mil (25.4 micron) thickness, and dried overnight under $N_2$ purge. As seen in Table 2b, again, it was found that the WVTR of the membranes in accordance with the present disclosure was about 17~60% higher than that of a membrane made from SBC-2.0 but lacking the particulate carbon component.

It is not understood how the particulate carbon affects the water vapor transmission rate of the membranes in accordance with the present disclosure, and the ability of carbon black to enhance the water transport performance of these membranes is surprising.

Surprisingly, also, and as shown in Table 3, the composite membrane according to Example 7 did not burn under the conditions of the UL 94HB test. Contrastingly, a membrane cast from SBC-2.0 solution had a total burn up to the 100 mm mark within 9 sec.

The invention claimed is:
1. An electrode or membrane comprising:
a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block; and b) particulate carbon;

wherein the particulate carbon (b) and the at least one sulfonated block copolymer (a) are present in a weight ratio of at least 0.01:1;

wherein (a) and (b) are provided in a dispersion;

wherein the electrode or membrane has a thickness ranging from 0.5 µm to 1000 µm; and wherein the electrode or membrane exhibits an area resistance of no more than 5 $\Omega cm^2$.

2. The electrode or membrane of claim 1, wherein the at least one sulfonated block copolymer (a) has the general configuration A-B-A, A-B-A-B-A, (A-B-A)nX, (AB)nX, A-D-B-D-A, A-B-D-B-A, (A-D-B)nX, (A-B-D)nX or mixtures thereof, wherein n is an integer from 2 to about 30, and X is a coupling agent residue, and when the at least one sulfonated block copolymer (a) includes at least one block D, each D block is a polymer block resistant to sulfonation and the plurality of A blocks are the same or different from each other, the plurality of B blocks are the same or different from each other, or the plurality of D blocks are the same or different from each other.

3. The electrode or membrane of claim 2, wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

4. The electrode or membrane of claim 1, wherein the particulate carbon (b) is coke, carbon black, activated carbon, or carbon nanotubes, optionally comprising a catalytic metal component.

5. The electrode or membrane of claim 1, wherein the particulate carbon (b) has an average particle size of from 0.1 nm to about 100 µm.

6. The electrode or membrane of claim 1, wherein the particulate carbon (b) is an activated carbon, optionally comprising a catalytic metal of Group 8, 9, 10, or 11 of the Periodic Table of the Elements.

7. The electrode or membrane of claim 1, wherein the particulate carbon (b) and the at least one sulfonated block copolymer (a) are present in a weight ratio of from 0.05:1 to 4:1.

8. A process for the manufacture of the electrode or membrane of claim 1 which comprises i) providing the dispersion comprising (a) and (b) of claim 1; and (c) at least one organic solvent as a liquid constituent;

ii) casting the dispersion;

iii) evaporating the at least one organic solvent (c) to obtain the electrode or membrane; and iv) optionally immersing the electrode or membrane obtained in (iii) in water or an aqueous medium.

9. An article comprising the electrode or membrane of claim 1.

10. The article of claim 9, wherein the at least one sulfonated block copolymer (a) and the particulate carbon (b) are present in a weight ratio of the particulate carbon (b) to the copolymer of from about 0.01:1 to about 1:1.

11. A composition comprising:

(a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block;

(b) particulate carbon; and (c) optionally a liquid constituent, wherein the particulate carbon (b) and the at least one sulfonated block copolymer (a) are present in a weight ratio of at least 0.01:1, and wherein when the composition is cast to a membrane having a thickness ranging from 0.5 µm to 1000 µm exhibits a water vapor transmission rate ranging from 20 to 30 l/m²/day in an inverted cup method, or a water vapor transmission rate ranging from 730 to 1030 g/m²/day in an upright cup method, and wherein the membrane exhibits an area resistance of no more than 5 $\Omega cm^2$.

12. A coated article comprising a substrate and the composition of claim 11 applied as a coating on the substrate.

13. The coated article of claim 12, wherein the substrate is a natural or synthetic, woven or non-woven material, or a mixture thereof.

14. The coated article of claim 12, which is a protective sheet, blanket, clothing or other garment, or equipment, adapted to protect from harm due to chemical or biological hazards.

15. The coated article of claim 12, wherein the substrate is a carbon electrode optionally comprising a catalytic metal component.

16. The coated article of claim 12, wherein the substrate comprises (a1) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block; and (c) optionally a liquid constituent, wherein the at least one sulfonated block copolymer (a1) of the substrate and the at least one sulfonated block copolymer (a) of the coating are identical or different, and wherein the substrate is free of particulate carbon.

17. A membrane comprising:

a) at least one sulfonated block copolymer comprising at least two polymer end blocks A and at least one polymer interior block B wherein each A block contains essentially no sulfonic acid or sulfonate functional groups and each B block is a polymer block containing from about 10 to about 100 mol percent sulfonic acid or sulfonate functional groups based on the number of monomer units of the B block; and b) particulate carbon;

wherein the particulate carbon (b) and the at least one sulfonated block copolymer (a) are present in a weight ratio of at least 0.01:1;

wherein (a) and (b) are provided in a dispersion;

wherein the membrane has a thickness ranging from 0.5 µm to 1000 µm;

and wherein the membrane exhibits an area resistance of no more than 5 $\omega cm^2$.

18. The membrane of claim 17, wherein the membrane has a thickness ranging from 20 µm to 250 µm.

19. The membrane of claim 17, wherein the membrane exhibits a water vapor transmission rate ranging from 20 to 30 l/m$^2$/day in an inverted cup method, or a water vapor transmission rate ranging from 730 to 1030 g/m$^2$/day in an upright cup method.

\* \* \* \* \*